United States Patent
Hegdal et al.

(10) Patent No.: US 10,628,205 B2
(45) Date of Patent: Apr. 21, 2020

(54) VIRTUAL MACHINE PLACEMENT WITH AUTOMATIC DEPLOYMENT ERROR RECOVERY

(71) Applicant: VMware, Inc., Palo Alto, CA (US)

(72) Inventors: Gururaja Hegdal, Bangalore (IN); Kiran Kasala, Bangalore (IN); M. S. Marichetty, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/003,281

(22) Filed: Jun. 8, 2018

(65) Prior Publication Data
US 2018/0293094 A1 Oct. 11, 2018

Related U.S. Application Data

(60) Continuation of application No. 14/229,740, filed on Mar. 28, 2014, now Pat. No. 10,007,542, which is a division of application No. 13/463,563, filed on May 3, 2012, now Pat. No. 8,843,935.

(51) Int. Cl.
*G06F 9/455* (2018.01)
*G06F 11/07* (2006.01)
*G06F 11/14* (2006.01)

(52) U.S. Cl.
CPC ...... *G06F 9/45558* (2013.01); *G06F 11/0712* (2013.01); *G06F 11/0793* (2013.01); *G06F 11/1471* (2013.01); *G06F 11/1484* (2013.01); *G06F 11/1438* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 6,363,499 B1 * | 3/2002 | Delo | G06F 8/62 714/15 |
| 6,477,561 B1 * | 11/2002 | Robsman | G06F 9/5083 718/102 |
| 8,185,776 B1 * | 5/2012 | Gentes | G06F 11/1438 709/223 |
| 8,850,442 B2 * | 9/2014 | Davis | G06F 9/5077 709/226 |
| 8,898,668 B1 | 11/2014 | Costea et al. | |

(Continued)

OTHER PUBLICATIONS

Office Action mailed for U.S. Appl. No. 15/862,088.
Office Action dated May 2, 2019 for U.S. Appl. No. 15/862,088.

*Primary Examiner* — Bing Zhao
(74) *Attorney, Agent, or Firm* — Thomas Horstemeyer, LLP

(57) ABSTRACT

Embodiments perform automatic selection of hosts and/or datastores for deployment of a plurality of virtual machines while monitoring and recovering from errors during deployment. In one example, an application can determine an optimized host list of computing devices for placing one or more virtual machines. The application can monitor a load of execution threads for overloading. Virtual machines can be deployed on a computing device from the optimized host list. The application can determine that a deployed task executed on one of the deployed virtual machines has failed and redeploy the associated virtual machine to another computing device on the optimized host list.

19 Claims, 23 Drawing Sheets

(56) References Cited

U.S. PATENT DOCUMENTS

2007/0234337 A1    10/2007   Suzuki et al.
2011/0214005 A1    9/2011   Biran et al.
2013/0111468 A1    5/2013   Davis et al.

* cited by examiner

VIRTUAL MACHINE PLACEMENT WITH AUTOMATIC DEPLOYMENT ERROR RECOVERY

CROSS-REFERENCE TO RELATED APPLICATION(S)

This application is a continuation application that claims priority to co-pending U.S. Patent Application titled, "Virtual Machine Placement with Automatic Deployment Error Recovery," having Ser. No. 14/229,740, filed Mar. 28, 2014, which is a divisional application of and claims the benefit of U.S. Patent Application titled, "Automatically Changing a Pre-Selected Datastore Associated with a Requested Host For a Virtual Machine Deployment Based on Resource Availability During Deployment of the Virtual Machine," having Ser. No. 13/463,563, filed May 3, 2012, which are incorporated herein by reference.

BACKGROUND

Some existing systems perform operations on virtual machines (VMs) in response to manual input from administrators. One or more VMs may be created, cloned, deployed, or relocated on destination hosts and destination datastores specified by the administrators. For example, operations may be performed on VMware's vApp (e.g., a logical entity representing one or more VMs) and VMware's VirtualAppliance (e.g., a VM image). The administrators select suitable destination hosts and destination datastores by manually scanning available hosts/datastores and selecting the most suitable candidates. For example, when scanning the available hosts/datastores, administrators compare the resource constraints of the VMs to be created with the resources available to each of the available hosts/datastores. Some of the exemplary resource constraints or characteristics include disk space, processor, memory, network constraints (e.g., port group availability and configuration), and host compatibility (e.g., some VMs cannot be cloned or deployed onto particular host and datastore versions).

Even if the administrators select compatible candidate hosts/datastores, it is difficult for the administrators to evaluate and select the best candidate hosts/datastores (e.g., ones that will execute the VMs without any performance bottlenecks). Additionally, the resources of the hosts/datastores change in real-time, sometimes rendering unsuitable the hosts/datastores that were previously suitable and selected by the administrators. When attempting to clone or deploy large numbers of VMs at one time using batch operations, administrators often end up selecting hosts/datastores that are overloaded or resource constrained. Further, with some of the existing systems, errors occurring during creation or deployment of the VMs require manual intervention from the administrators. In datacenters with large numbers of hosts, selecting the suitable host/datastore candidates can be complex, tedious, time consuming, and error prone with sub-optimal host/datastore selection and deployment.

SUMMARY

One or more embodiments described herein automatically select candidate hosts and candidate datastores for deployment of a plurality of virtual machines (VMs). A placement engine receives a request to select, for a plurality of VMs, candidate hosts and candidate datastores. The placement engine selects the candidate hosts and the candidate datastores based on resource requirements for the plurality of VMs and available resources. During deployment of the plurality of VMs, the placement engine updates the selected candidate hosts and/or candidate datastores based on a re-assessment of the available resources.

To facilitate automatic error recovery during deployment, embodiments described herein maintain a status log describing deployment of the plurality of VMs. If a deployment failure is detected, the placement engine resolves the failure and continues with deployment using the maintained status log.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Figure 1:
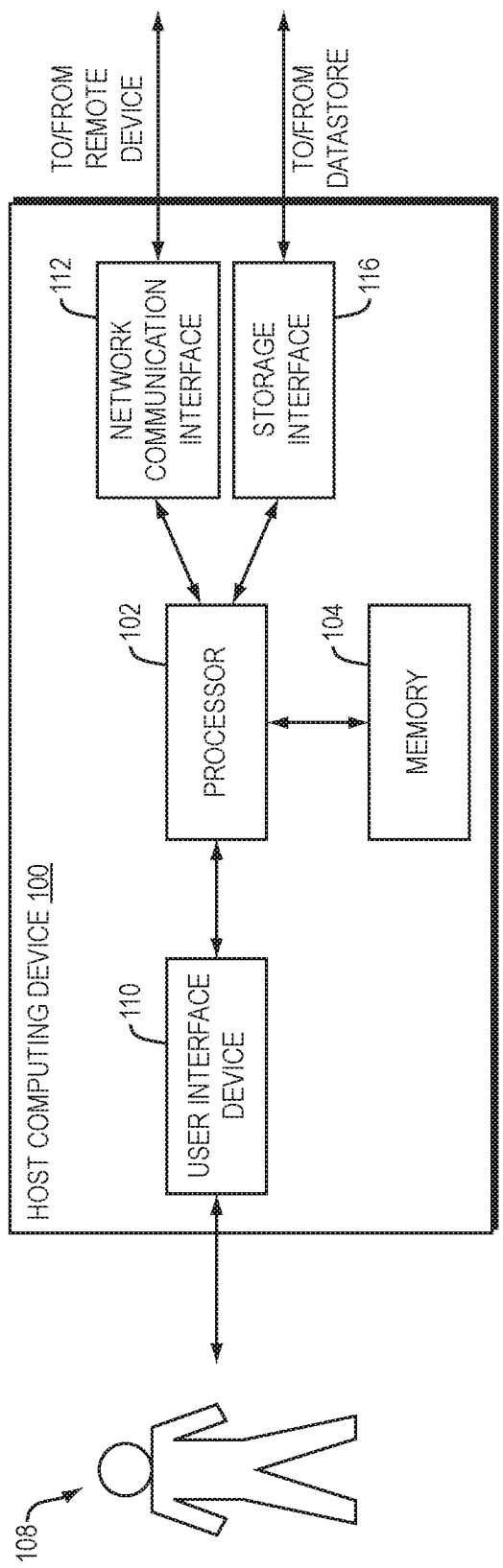
FIG. 1 is a block diagram of an exemplary host computing device.

Embodiments described herein facilitate the automatic selection of hosts 314 and/or datastores 316 for deployment of a plurality of virtual machines (VMs). In some embodiments, a VM placement engine 310 automatically chooses an optimized set of recommended candidate hosts 314 and datastores 316 for placing the VMs based at least on a comparison of VM resource constraints and available resources. Accordingly, manual provisioning and configuration effort (e.g., by an administrator 402) is reduced. Further, administrator 402 is isolated or shielded from the details of host/datastore selection during large batch operations.

VM placement engine 310 further operates to deploy the VMs, monitor the deployment, and automatically detect and recover from deployment errors. In some embodiments, VM placement engine 310 has an automatic mode and a manual mode for implementing the recommendations. In automatic mode, VM placement engine 310 provides optimized host/datastore recommendations and starts VM creation operations without input or intervention from administrator 402. In manual mode, VM placement engine 310 provides optimized host/datastore recommendations for review by administrator 402 before starting VM creation operations.

Embodiments of the disclosure release administrator 402 from the complex and tedious decisions involving in choosing the best or optimal hosts 314 and datastores 316 to hold the VMs to be created. Further, VM placement engine 310 monitors the requested tasks and available resources during VM operations (e.g., cloning, creation, deployment, relocation, etc.). With an up-to-date assessment of the available resources, VM placement engine 310 is also able to take advantage of dynamic changes in host/datastore resources to improve the set of recommended hosts/datastores during deployment, implement load balancing more evenly during deployment, and perform error handling during deployment by anticipating, detecting, and recovering from errors. For example, if one of hosts 314 or datastores 316 fails during deployment, VM placement engine 310 automatically attempts to find alternate hosts/datastores on which to restart failed VM operations.

FIG. 1 is a block diagram of an exemplary host computing device 100. Host computing device 100 includes a processor 102 for executing instructions. In some embodiments, executable instructions are stored in a memory 104. Memory 104 is any device allowing information, such as executable instructions, to be stored and retrieved. For example, memory 104 may include one or more random access memory (RAM) modules, flash memory modules, hard disks, solid state disks, and/or optical disks.

Host computing device 100 may include a user interface device 110 for receiving data from a user 108 and/or for presenting data to user 108. User 108 may interact indirectly with host computing device 100 via another computing device such as VMware's vCenter Server or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some embodiments, user interface device 110 operates to receive data from user 108, while another device (e.g., a presentation device) operates to present data to user 108. In other embodiments, user interface device 110 has a single component, such as a touch screen, that functions to both output data to user 108 and receive data from user 108. In such embodiments, user interface device 110 operates as a presentation device for presenting information to user 108. In such embodiments, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some embodiments, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more of datastores 316, which store virtual disk images, software applications, and/or any other data suitable for use with the methods described herein. In exemplary embodiments, storage interface 116 couples host computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
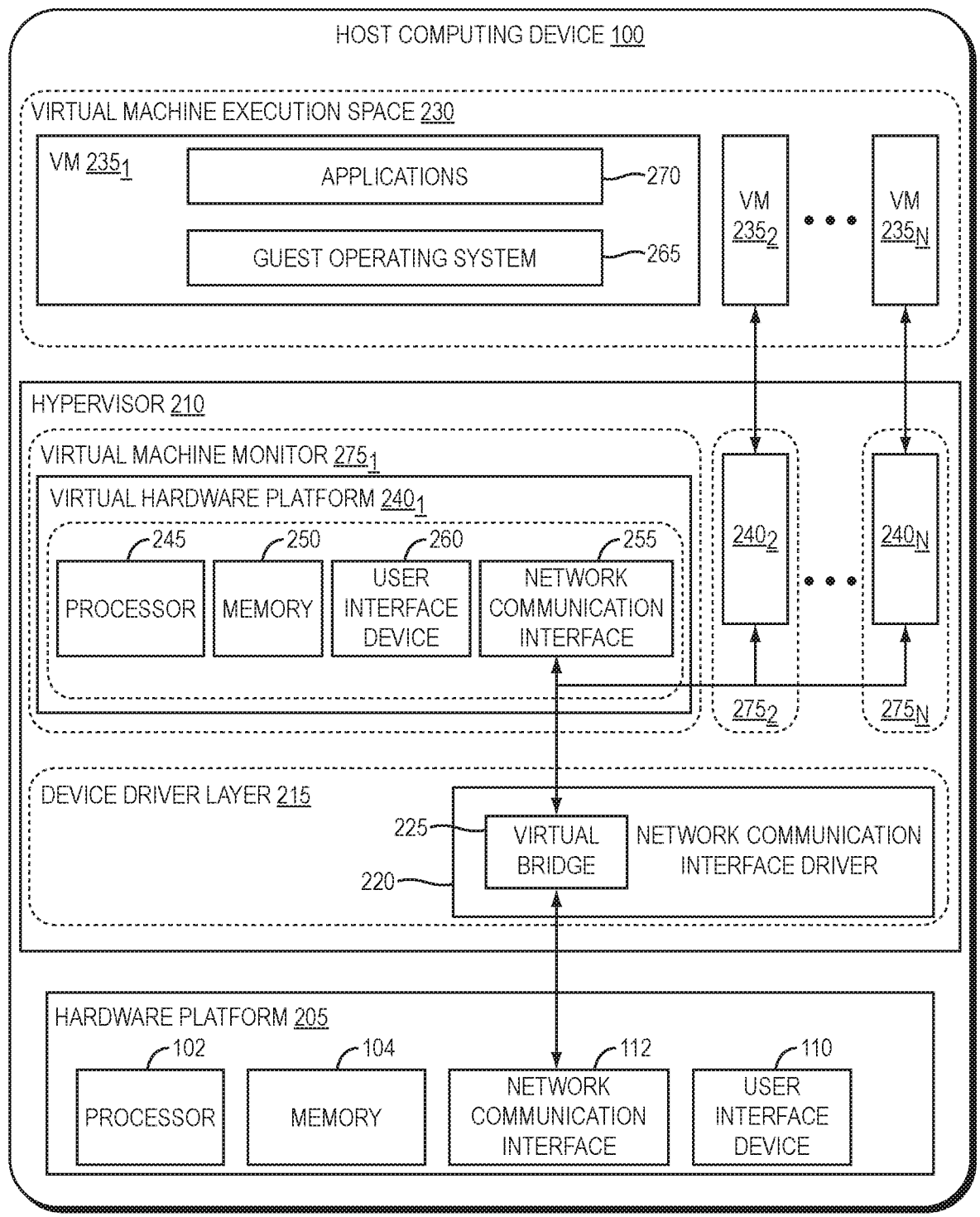
FIG. 2 is a block diagram of virtual machines (VMs) that are instantiated on a computing device, such as the host computing device shown in FIG. 1.

FIG. 2 depicts a block diagram of virtual machines $235_1$, $235_2$ ... $235_N$ that are instantiated on host computing device 100, which may be referred to as a host computing device or simply host 314. Host computing device 100 includes a hardware platform 205, such as an x86 architecture platform. Hardware platform 205 may include processor 102, memory 104, network communication interface 112, user interface device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user interface device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user interface device 260 and other emulated I/O devices in VM $235_1$). Hypervisor 210 may manage (e.g., monitor, initiate, and/or terminate) execution of VMs $235_1$-$235_N$ according to policies associated with hypervisor 210, such as a policy specifying that VMs $235_1$-$235_N$ are to be automatically restarted upon unexpected termination and/or upon initialization of hypervisor 210. In addition, or alternatively, hypervisor 210 may manage execution VMs $235_1$-$235_N$ based on requests received from a device other than host computing device 100. For example, hypervisor 210 may receive an execution instruction specifying the initiation of execution of first VM $235_1$ from a management device via network communication interface 112 and execute the execution instruction to initiate execution of first VM $235_1$.

In some embodiments, memory 250 in first virtual hardware platform $240_1$ includes a virtual disk that is associated with or "mapped to" one or more virtual disk images stored in memory 104 (e.g., a hard disk or solid state disk) of host computing device 100. The virtual disk image represents a file system (e.g., a hierarchy of directories and files) used by first virtual machine $235_1$ in a single file or in a plurality of files, each of which includes a portion of the file system. In addition, or alternatively, virtual disk images may be stored in memory 104 of one or more remote computing devices 100, such as in a storage area network (SAN) configuration. In such embodiments, any quantity of virtual disk images may be stored by the remote computing devices 100.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an embodiment, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in host computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Virtual hardware platforms $240_1$-$240_N$ may be considered to be part of virtual machine monitors (VMM) $275_1$-$275_N$ that implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an embodiment of the disclosure is included as a component in VMware's ESX brand software, which is commercially available from VMware, Inc.

Figure 3:
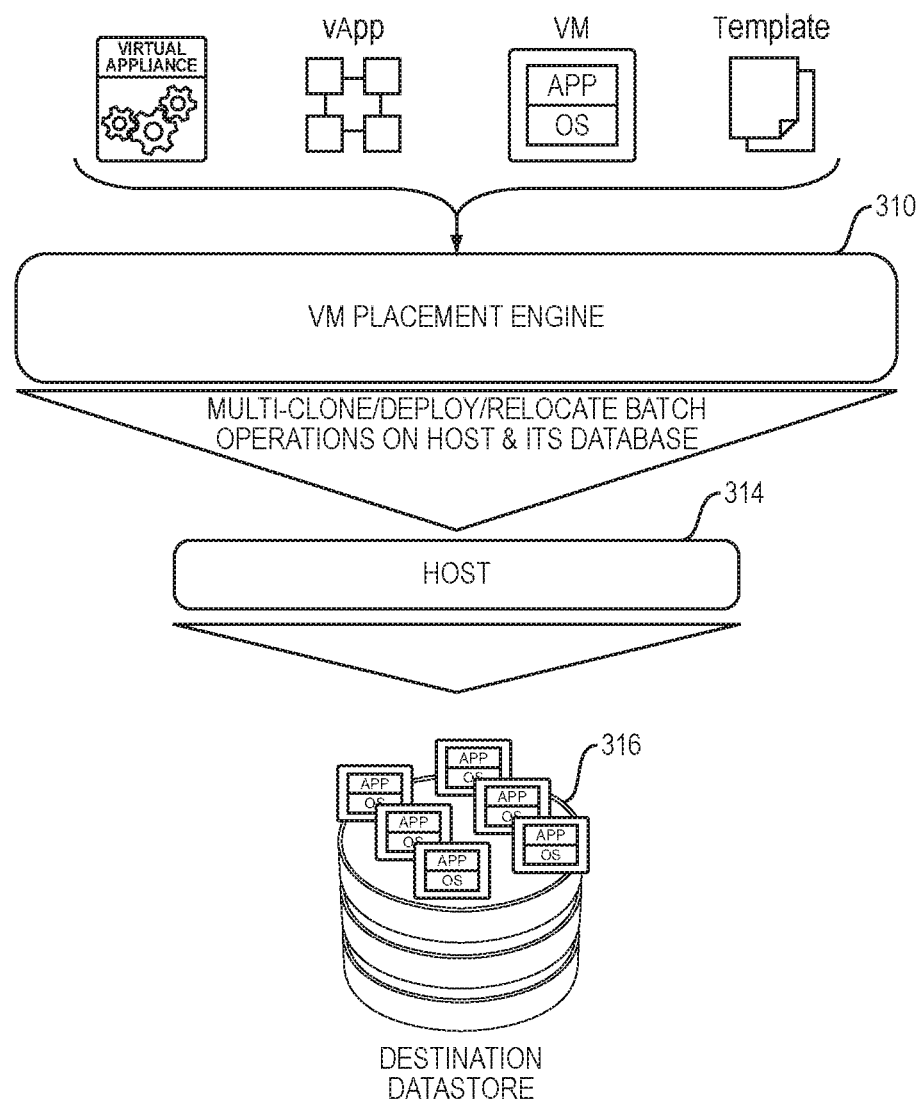
FIG. 3 is a block diagram of an exemplary system for selecting hosts and datastores on which to deploy a plurality of VMs.

FIG. 3 is a block diagram of an exemplary system for selecting hosts 314 and datastores 316 on which to deploy a plurality of virtual machines (VMs). VM placement engine 310 executes on a computing device in a system such as VMware's vCenter Server. VM placement engine 310 receives, as input, a source VM or other description of a plurality of VMs to be created. The source VM may be, for example, a virtual appliance, a virtual application, a VM, a template, or other VM configuration description. VM placement engine 310 creates, clones, deploys, relocates, or performs other operations for a batch of VMs. For example, aspects of the disclosure manage threads by determining how many threads to trigger without overloading VM placement engine 310 with concurrent tasks, maintaining a status of each running thread, and queuing remaining threads to be triggered (and when to trigger each of the threads).

VM placement engine 310 has access to one or more of hosts 314 such as candidate hosts, target hosts, destination hosts, or other computing devices. An exemplary host 314 is VMware's ESX server. Host 314 has access to one or more of datastores 316. Each of datastores 316 is capable of containing VMs, such as the six (6) VMs illustrated in the example of FIG. 3.

Figure 4:
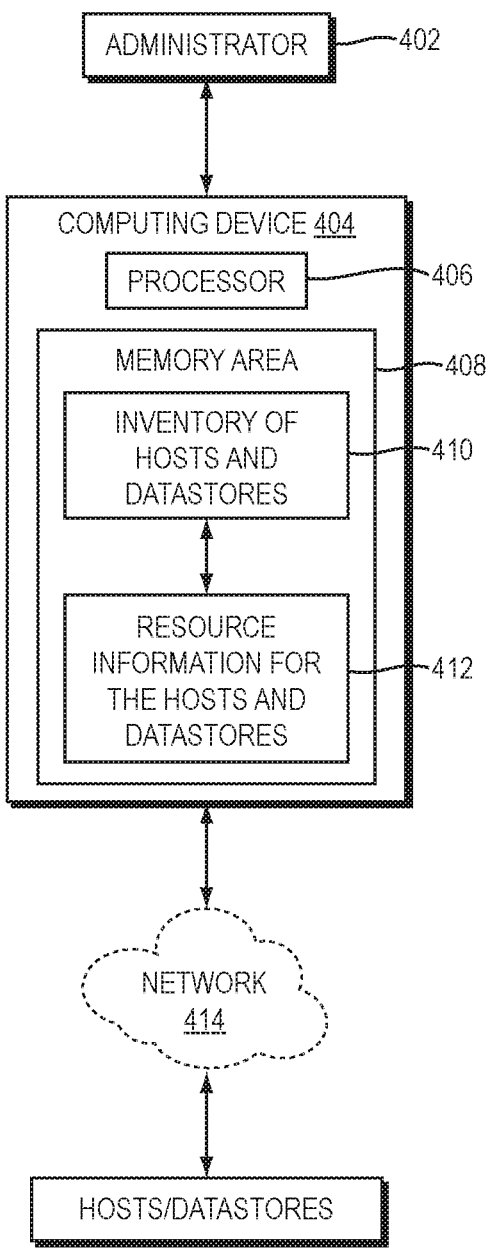
FIG. 4 is a block diagram of an exemplary computing device for implementing a VM placement engine.

FIG. 4 is a block diagram of an exemplary computing device 404 for implementing VM placement engine 310. Administrator 402, or other user 108, interacts with computing device 404 to provide requests to perform operations on a batch or other plurality of VMs, such as described herein. Computing device 404 represents any device executing instructions (e.g., as application programs, operating system functionality, or both) to implement the operations and functionality associated with computing device 404. For example, computing device 404 executes instructions to implement VM placement engine 310. Computing device 404 may include any computing device or processing unit. For example, computing device 404 may represent a group of processing units or other computing devices, such as in a cloud computing configuration.

Computing device 404 has at least one processor 406 and a memory area 408. Processor 406 includes any quantity of processing units, and is programmed to execute computer-executable instructions for implementing aspects of the disclosure. The instructions may be performed by processor 406 or by multiple processors executing within computing device 404, or performed by a processor external to computing device 404. In some embodiments, processor 406 is programmed to execute instructions such as those illustrated in the figures to implement VM placement engine 310.

Memory area 408 includes any quantity of computer-readable media associated with or accessible by computing device 404. Memory area 408, or portions thereof, may be internal to computing device 404, external to computing device 404, or both.

In the example of FIG. 4, memory area 408 further stores an inventory 410 of hosts 314 and datastores 316. Inventory 410 may represent a topology of hosts 314 and datastores 316 accessible to computing device 404 for performing operations relating to VMs. Inventory 410 may be implemented in any data structure, such as records in a database. Inventory 410 identifies hosts 314 and datastores 316 via identifiers unique among hosts 314 and datastores 316. Memory area 408 further stores resource information 412 for hosts 314 and datastores 316. Resource information 412 includes, but is not limited to, compatibility information, hardware versions, processor type and speed, memory configuration, disk space, memory capacity (e.g., random access memory), or other information describing hosts 314 and/or datastores 316.

In some embodiments, computing device 404 accesses hosts 314, and datastores 316 associated therewith, via a network 414. Network 414 represents any means for communication between computing device 404 and hosts 314 and datastores 316. Aspects of the disclosure are operable with any network type or configuration.

Figure 5:
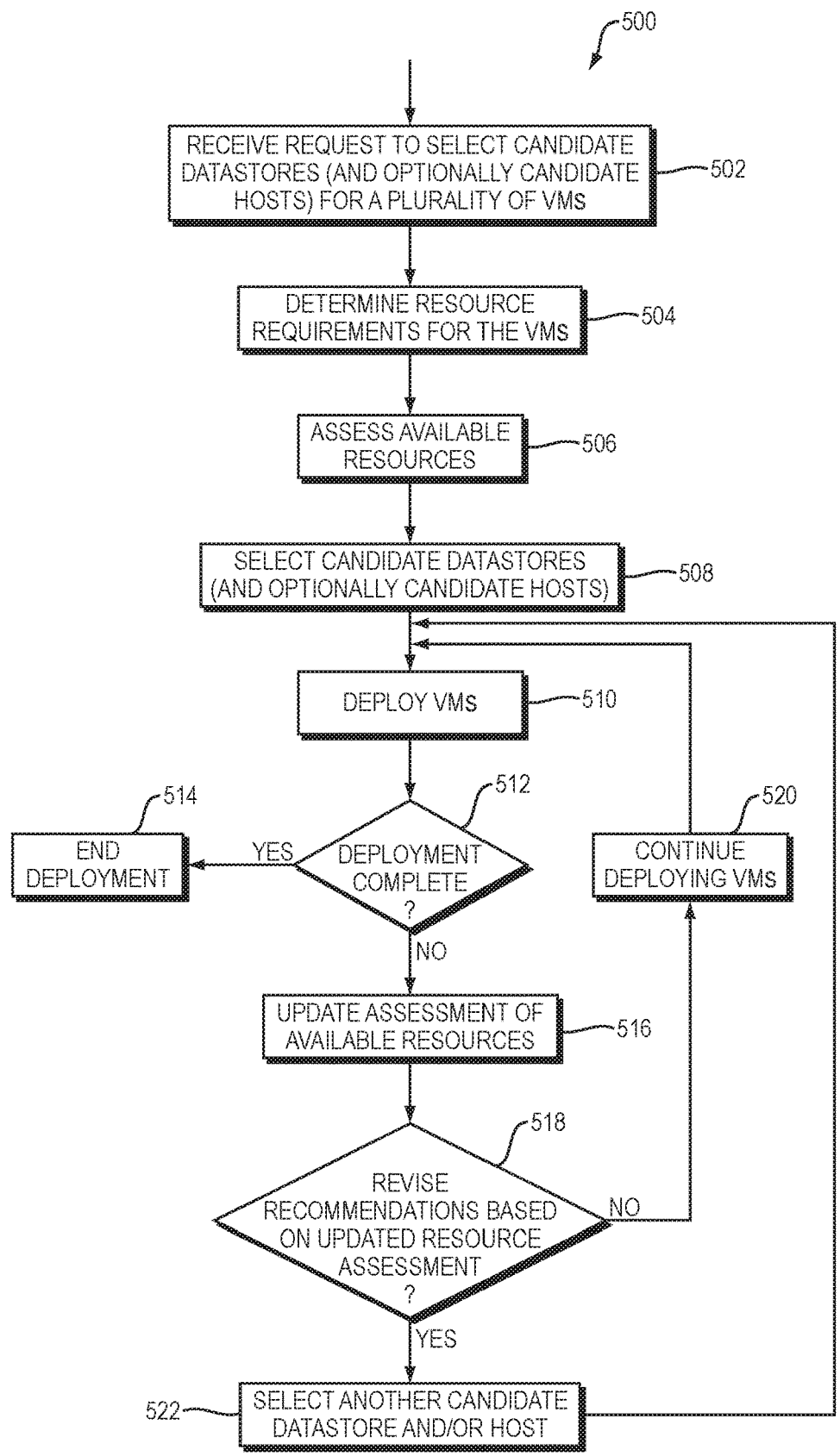
FIG. 5 is a flowchart of an exemplary method performed by the VM placement engine to select candidate hosts and candidate datastores for a plurality of VMs.

FIG. 5 is a flowchart of an exemplary method 500 performed by VM placement engine 310 to select candidate hosts 314 and candidate datastores 316 for a plurality of VMs. While method 500 is described with reference to VM placement engine 310 (shown in FIG. 3), it is contemplated that method 500 may be performed by any computing device.

At 502, VM placement engine 310 receives a request to select, for a plurality or batch of VMs, one or more candidate datastores 316. The request is received from administrator 402, or from an application program designed to automatically generate the request (as part of maintenance operations for a cluster or other group of hosts 314). The request defines the quantity of VMs to be created. In some embodiments, the request also identifies at least one of hosts 314 to contain the VMs. For example, the request identifies a datacenter, cluster, or folder to contain the plurality of VMs to be created. VM placement engine 310 is then limited to selecting candidate datastores 316 accessible to the identified host(s) 314. Alternatively, or in addition, the request may include an identifier corresponding to a prohibited host 314, datacenter, cluster, or folder on which none of the VMs should be deployed. For example, administrator 402 may intend to remove one of hosts 314 for maintenance or protect one of hosts 314 that is already running critical VMs.

In other embodiments, host 314 is not identified, and VM placement engine 310 is requested to identify at least one of the hosts 314, such as described below.

At 504, VM placement engine 310 determines the resource requirements for the plurality of VMs. Exemplary resource requirements include hardware version information, memory requirements, processor resources, storage requirements, network configuration requirements, and other VM configuration requirements. In some embodiments, the request identifies a source VM from which the plurality of VMs are to be created. In such embodiments, VM placement engine 310 determines the resource requirements by scanning or otherwise analyzing the source VM to identify the resource requirements associated with the source VM. In other embodiments, the request identifies the resource requirements of the plurality of VMs.

At 506, VM placement engine 310 assesses the available resources for creating the plurality of VMs. For example, VM placement engine 310 accesses inventory 410 stored in memory area 408 to identify candidate datastores 316 (and, optionally, hosts 314 if no host 314 was included in the request from administrator 402).

At 508, VM placement engine 310 compares the resource requirements of the VMs to be created with the available resources to select one or more candidate datastores 316 (and, optionally, one or more hosts 314 if no host 314 was included in the request from administrator 402). Such a comparison includes, for example, searching for compatible or matching hardware versions, memory usage, host compatibility, datastore compatibility, input/output load, and/or network configuration (e.g., network port group compatibility or network interface card uplink speed). Compatibility may be analyzed by, for example, use of a compatibility chart accessible to VM placement engine 310. Finding a matching port group enables the VMs to access the network, while a matching uplink speed (e.g., network interface card connected to a port group) enables fast communication. Additional examples of hosts/datastore selection are described below with reference to FIGS. 18-20.

The selected hosts/datastores represent recommendations from VM placement engine 310 for creating the VMs. One or more of the recommendations may be presented to administrator 402 for confirmation, authorization, or other approval before deployment (e.g., manual mode) or VM placement engine 310 may automatically begin deployment of one or more of the VMs without explicit confirmation from administrator 402 (e.g., automatic mode). Administrator 402 may accept or reject any, all, or none of the recommended hosts/datastores.

At 510, VM placement engine 310 begins deployment operations for the plurality of VMs. If deployment is complete at 512, the deployment operations end at 514. Otherwise, VM placement engine 310 continually monitors the available resources and updates the recommended hosts/datastores based on changes in the available resources. For example, VM placement engine 310 updates the assessment of the available resources at 516. If a more optimal host 314 or datastore 316 has become available and VM placement engine 310 concludes that the recommendations should be revised at 518 based on a comparison between the resource requirements and the updated assessment, VM placement engine 310 alters the selected hosts/datastores at 522. In manual mode, VM placement engine 310 presents the updated recommendations to administrator 402 for confirmation. In automatic mode, VM placement engine 310 automatically alters VM deployment based on the updated recommendations. If VM placement engine 310 concludes that the recommendations should not be revised at 518, deployment continues at 520. In this manner, VM placement engine 310 dynamically adjusts to a dynamic resource pool.

Deployment of the VMs may also be delayed, postponed, or otherwise timed. For example, the request may specify a time (e.g., absolute or relative) for initiating deployment of the VMs. VM placement engine 310 delays deployment until the specified time.

VM placement engine 310 is capable of handling multiple deployment requests or jobs simultaneously. In some embodiments, each of the requests has a priority value defining the relative or absolute priority of each request. VM placement engine 310 orders the requests based on the priority values and processes the requests based on the associated priority values. For example, candidate host/datastore selection is performed for the requests in order of priority. In an example in which there are three administrators 402 in a datacenter, two of administrators 402 may have issued requests to deploy 100 VMs on two host clusters. Without any priority specified by either administrator 402, VM placement engine 310 gives equal priority to each of the requests. If the third administrator 402 sends a request with a high priority value to deploy 30 VMs on another host cluster, VM placement engine 310 begins processing this request at the expense of the other two requests already being processed. For example, VM placement engine 310 allocates more resources to the high priority request relative to the other two requests.

During or after deployment of at least one of the VMs, VM placement engine 310 performs a post-deployment integrity check or other error detection. The post-deployment integrity check includes, for example, comparing a configuration of the deployed VM to the resource requirements to confirm that the deployed VM is compliant. The post-deployment integrity check also includes, for example, power cycling the deployed VM by briefly powering on and then powering off the deployed VM to ensure the deployed VM is ready for execution. Additional description of such compliance checks is included below with reference to FIG. 11.

Figure 6:
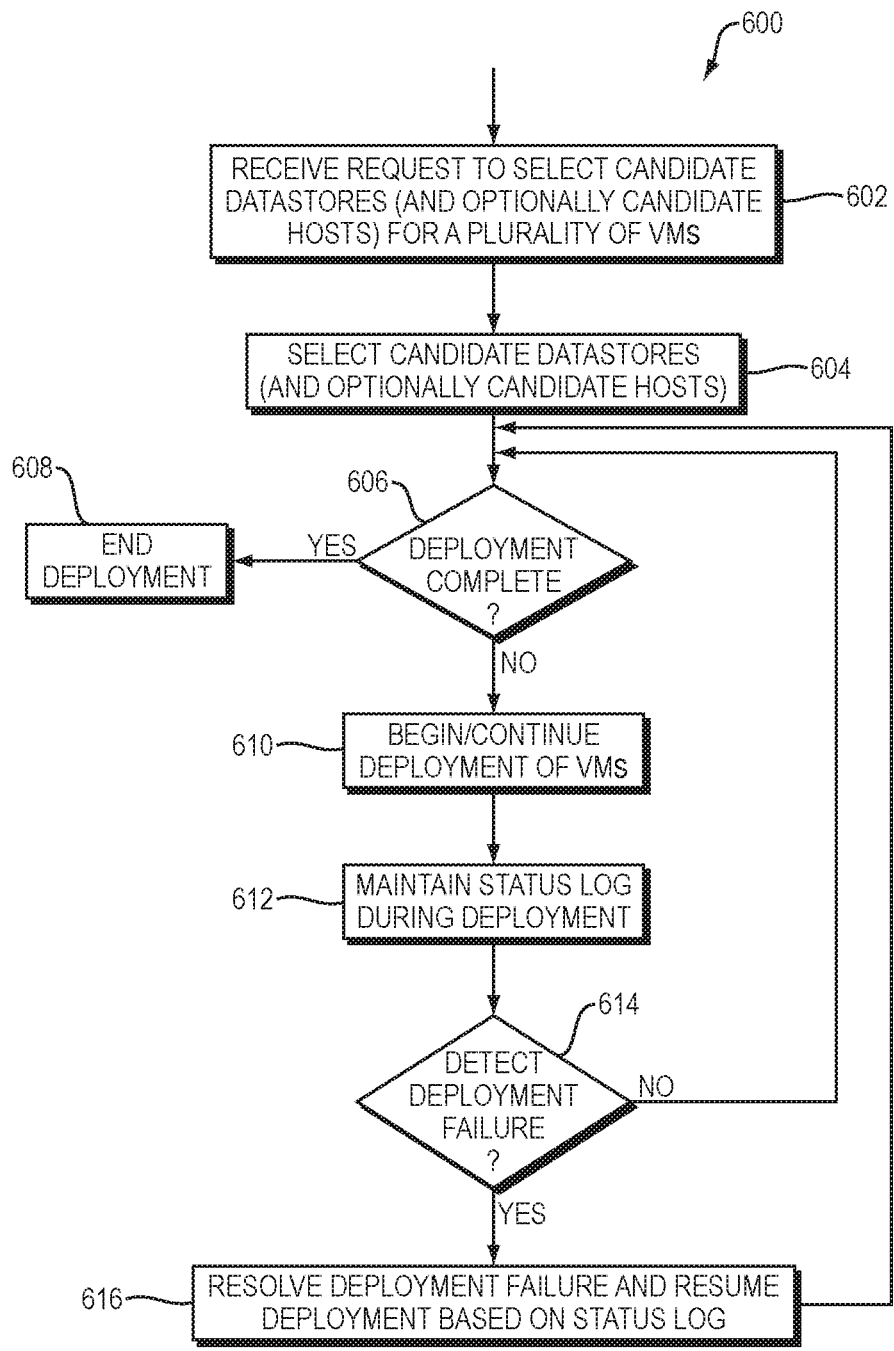
FIG. 6 is a flowchart of an exemplary method performed by the VM placement engine to manage error recovery during deployment of a plurality of VMs.

FIG. 6 is a flowchart of an exemplary method 600 performed by VM placement engine 310 to manage error recovery during deployment of a plurality of VMs. While method 600 is described with reference to VM placement engine 310 (shown in FIG. 3), it is contemplated that method 600 may be performed by any computing device. In some embodiments, one or more computer-readable storage media include computer-executable instructions that, when executed, cause processor 406 to place virtual machines while implementing error recovery by performing the operations illustrated in FIG. 6.

At 602, VM placement engine 310 receives a request to select at least one candidate datastore 316 to contain a plurality of VMs. The request is received from administrator 402, or from an application program designed to automatically generate the request (as part of maintenance operations for a cluster or other group of hosts 314). The request defines the quantity of VMs to be created. In the example of FIG. 6, the request also identifies at least one of hosts 314 to contain the VMs. For example, the request identifies a datacenter, cluster, or folder to contain the plurality of VMs to be created. VM placement engine 310 is then limited to selecting candidate datastores 316 accessible to the identified host(s) 314.

In the example of FIG. 6, the request also specifies resource requirements associated with the VMs to be created. At 604, VM placement engine 310 selects candidate datastore 316 from datastores 316 accessible to host 314 identified in the request. For example, VM placement engine 310 compares the resource requirements of the VMs to be created with the available resources (e.g., associated with datastores 316 accessible to host 314) to select one or more candidate datastores 316. Such a comparison includes, for example, searching for compatible or matching hardware versions, memory usage, host compatibility, datastore compatibility, input/output load, and/or network configuration (e.g., network port group compatibility). Examples of datastore selection are described below with reference to FIGS. 18-20.

VM placement engine 310 begins VM deployment at 610 on host 314 and selected candidate datastore 316, and maintains a status log during deployment at 612. The status log represents any recordation of the status of deployment of the plurality of VMs. VM placement engine 310 updates the status log, for example, at the start and conclusion of deployment of each of the VMs. In some embodiments, the status log is a single record, file, or other object storing the status. In other embodiments, a separate status log is maintained for each VM being deployed (e.g., separate records in a database). The status log may contain entries each identifying one of the VMs, a timestamp, a status or progress description, and other information. For example, the status log may store input received from administrator 402, a source VM identifier, a source VM host identifier, initial host/datastore recommendations, deployment status of each VM (e.g., completed or in-progress), and overall job status.

If a deployment failure is detected at any time during deployment (e.g., such as at 614), VM placement engine 310 relies at least in part on the status log to continue with deployment. For example, VM placement engine 310 may monitor for failures (e.g., perform a post-deployment integrity check on each deployed VM) or receive notification of such failures. Examples of deployment failures include source host failure, VM placement engine 310 failure, candidate host failure, and candidate datastore 316 failure. Examples failure scenarios are illustrated and described with reference to other figures herein.

At 616, VM placement engine 310 resolves, or otherwise adjusts to, the detected deployment failure and resumes deployment based on the status log. For example, VM placement engine 310 consults the status log to identify which VMs have not been fully deployed and/or determine the progress of deployment. Resolving the failure may include removing or cleaning up partially-deployed VMs. Resolving the failure may also include deleting or otherwise removing VMs that are not compliant (e.g., those that fail the post-deployment integrity check).

In embodiments in which the detected deployment failure is a failure of the destination host during deployment, VM placement engine 310 resolves the deployment failure by searching for a new compatible host that has access to the selected candidate datastore. VMs deployed on the failed host are then re-deployed on the new host. In embodiments in which the detected deployment failure is a failure of one of the candidate datastores, VM placement engine 310 resolves the deployment failure by selecting a new candidate datastore accessible to host. VMs deployed on the failed datastore are then re-deployed on the new candidate datastore.

After resolving the failure(s), VM placement engine 310 proceeds to resume deployment of the VMs. If deployment is complete at 606, deployment operations cease at 608.

The status log further enables VM placement engine 310 to provide additional functionality. For example, VM placement engine 310 may analyze the status log during deployment to determine how many VMs have been deployed, how many VMs are to be deployed, how many VMs are currently being deployed, duration of each VM deployment, average deployment duration for each of the VMs, and other statistics. In this manner, VM placement engine 310 is able to estimate, based on the maintained status log, the time remaining to deploy the batch of VMs.

For example, VM placement engine 310 scans the selected hosts/datastores for parameters such system load and network bandwidth availability (e.g., from source host to each selected destination host) to determine the approximate time to complete deployment of one of the VMs. With this information, VM placement engine 310 may estimate a time for completing the remainder of a batch of VMs. The VM placement dynamically maintains an assessment of each of the selected hosts/datastores during deployment and is thus able to dynamically update the estimated completion time in response to changing loads, bandwidth constraints, or other issues that may affect the selected hosts/datastores.

Figure 7:
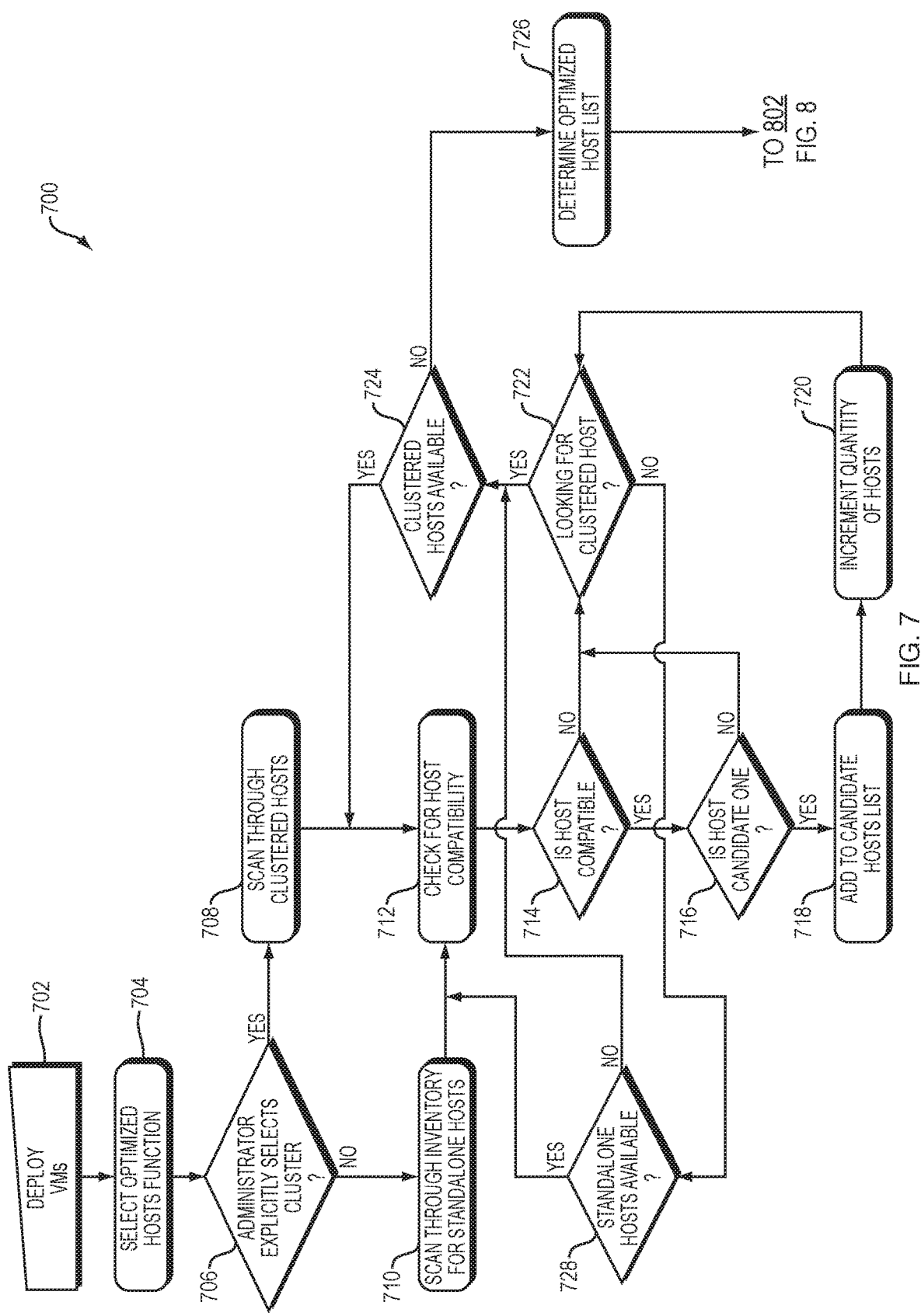
FIG. 7 is a flowchart of an exemplary method performed by the VM placement engine to determine an optimized host list for a plurality of VMs.

FIG. 7 is a flowchart of an exemplary method 700 performed by VM placement engine 310 to determine an optimized host list for a plurality of VMs. While method 700 is described with reference to VM placement engine 310 (shown in FIG. 3), it is contemplated that method 700 may be performed by any computing device.

At 702, VM placement engine 310 initiates a VM deployment operation. For example, VM placement engine 310 executes to select a set of optimum hosts 314 at 704. If administrator 402 has explicitly selected a cluster at 706, VM placement engine 310 scans through the cluster of hosts 314 at 708 to check for host compatibility at 712. If administrator 402 has not explicitly identified a cluster at 706, VM placement engine 310 scans through inventory 410 of standalone hosts 314 at 710 and checks for host compatibility at 712. If a selected host 314 is not compatible at 714, VM placement engine 310 selects another host 314.

If the selected host 314 is compatible at 714 and is a possible candidate at 716, VM placement engine 310 adds the selected host 314 to a candidate host list or set at 718. A quantity of selected hosts 314 is incremented at 720 and additional hosts 314 are identified and selected. For example, VM placement engine 310 searches for additional standalone hosts 314 at 722 and at 728, or looks for additional clustered hosts 314 at 722 and at 724. After there are no more available standalone hosts 314 at 728 or available clustered hosts 314 at 724, VM placement engine 310 determines an optimized host list at 726. Processing continues with the flowchart illustrated in FIG. 8, next described.

Figure 8:
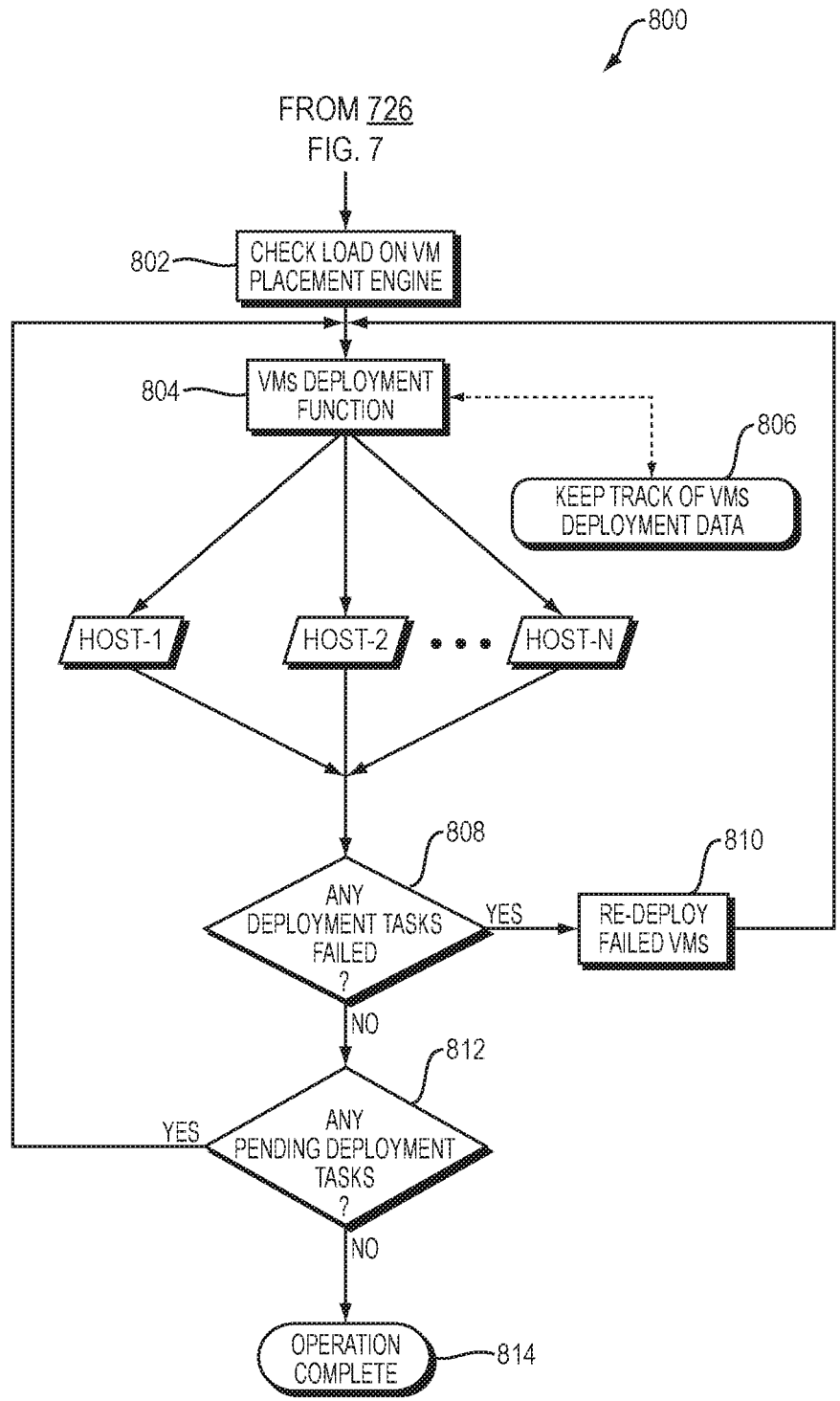
FIG. 8 is a flowchart of an exemplary method performed by the VM placement engine to manage the deployment status of a plurality of VMs.

FIG. 8 is a flowchart of an exemplary method 800 performed by VM placement engine 310 to manage the deployment status of a plurality of VMs. While method 800 is described with reference to VM placement engine 310 (shown in FIG. 3), it is contemplated that method 800 may be performed by any computing device.

After determining the optimized host list in FIG. 7, the load on the computing device executing VM placement engine 310 is checked at 802 and VM placement engine 310 executes a deployment function at 804. A status log keeps track of deployment data for the VMs at 806 as the VMs are deployed on hosts 314.

VM placement engine 310 checks the status of deployment tasks at 808 and, if any tasks have failed, attempts to re-deploy at 810 the VMs affected by the failure. If no tasks have failed and there are additional pending deployment tasks at 812, deployment continues at 804. Otherwise, the deployment operation is complete at 814.

Figure 9:
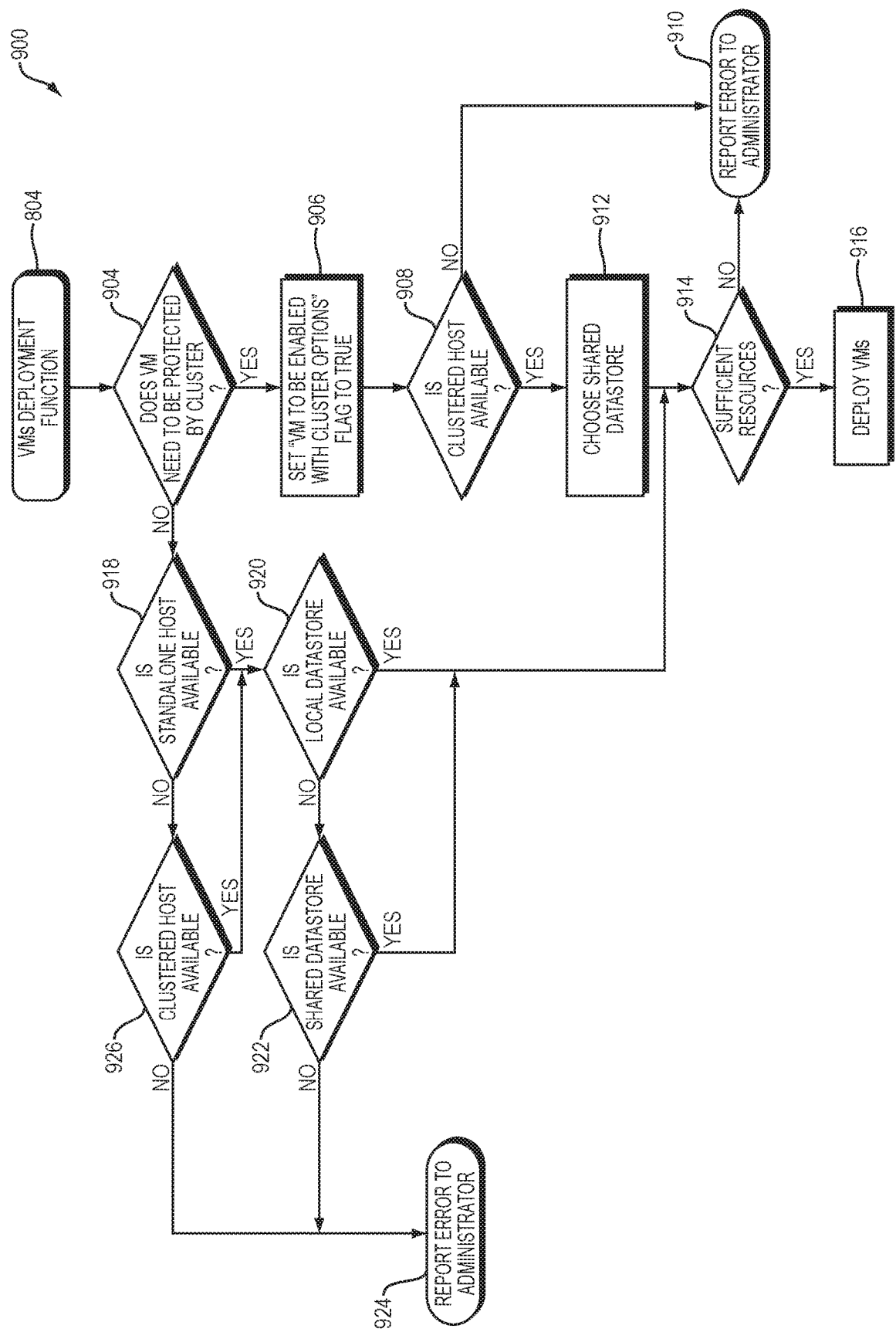
FIG. 9 is a flowchart of an exemplary method performed by the VM placement engine to manage deployment of a plurality of VMs.

FIG. 9 is a flowchart of an exemplary method 900 performed by VM placement engine 310 to manage deployment of a plurality of VMs. While method 900 is described with reference to VM placement engine 310 (shown in FIG. 3), it is contemplated that method 900 may be performed by any computing device. The operations illustrated in FIG. 9 represent an exemplary implementation of the deployment function at 804 in FIG. 8.

VM placement engine 310 determines if the VM to be deployed is to be protected by a particular cluster or cluster type at 904. For example, the VM be requested for deployment in a high availability (HA) cluster, in a cluster with a distributed resource scheduler (DRS), or be subject to distributed power management (DPM). If so, VM placement engine 310 sets a "VM to be enabled with cluster options" flag to TRUE at 906. If the requested type of clustered host 314 is not available at 908, an error is reported to administrator 402 at 910. Otherwise, a shared one of datastores 316 is next selected at 912 and resources of the clustered host 314 and/or resource are checked at 914. If the resources are not sufficient at 914, an error is reported to administrator 402 at 910. Otherwise, the VM is deployed on the selected host 314 and datastore 316 at 916.

If the VM to be deployed is not requested to be associated with a particular cluster at 904, VM placement engine 310 checks if a standalone host 314 is available at 918. If a standalone host 314 is available at 918 or a clustered host 314 is available at 926, VM placement engine 310 searches for a local one of datastores 316. If local datastore 316 is available at 920 or shared datastore 316 is available at 922, VM placement engine 310 proceeds to check for resources at 914 and deploy the VM is the resources are sufficient. Otherwise, an error is reported at 924.

Figure 21:
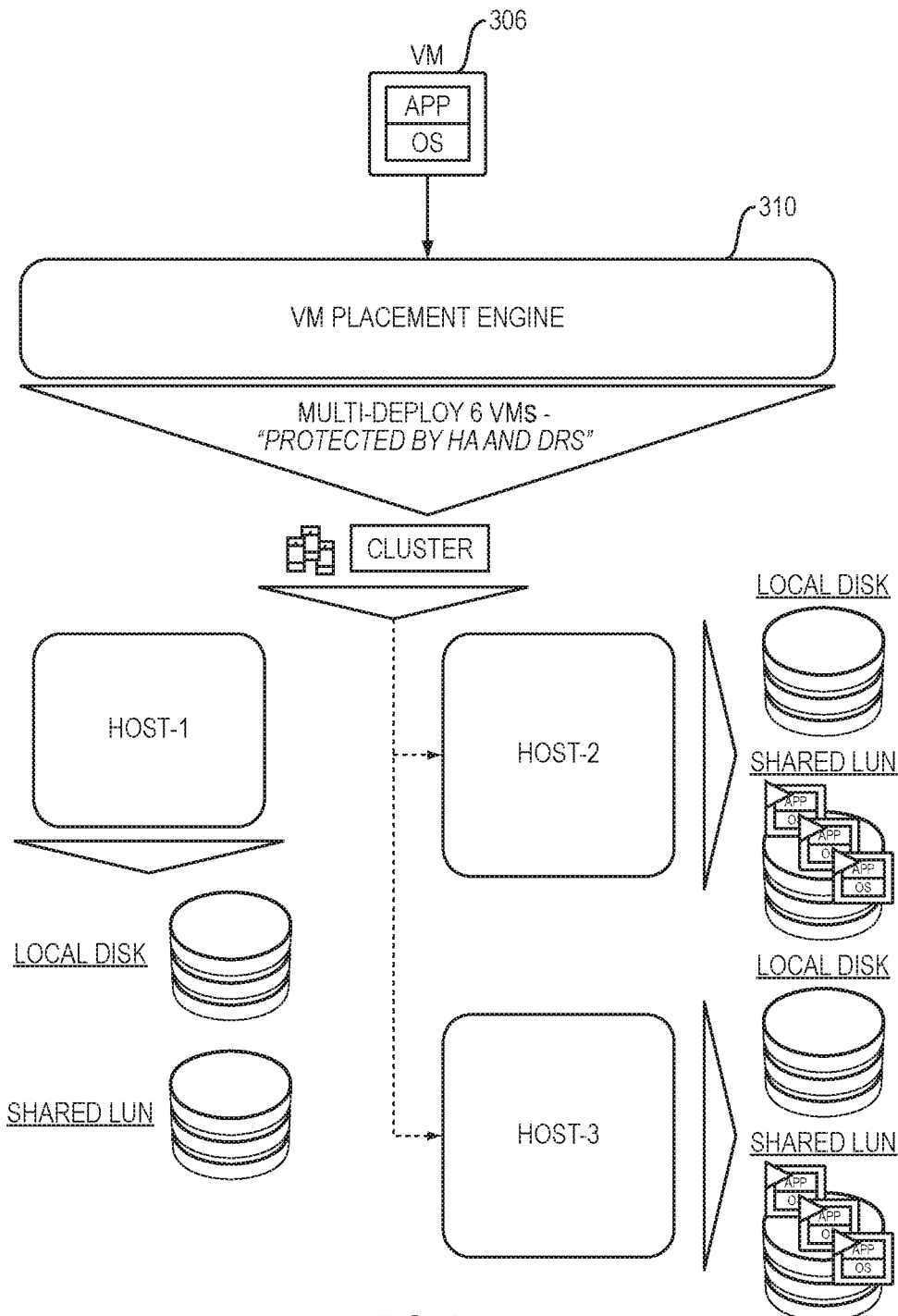
FIG. 21 is a block diagram of the selection of clustered hosts to contain VMs.

An exemplary block diagram illustrating the deployment of VMs using the exemplary method 900 is shown in FIG. 21. In FIG. 21, the VMs are deployed on shared logical unit number (LUN) datastores 316 on Host-2 and Host-3.

Figure 10:
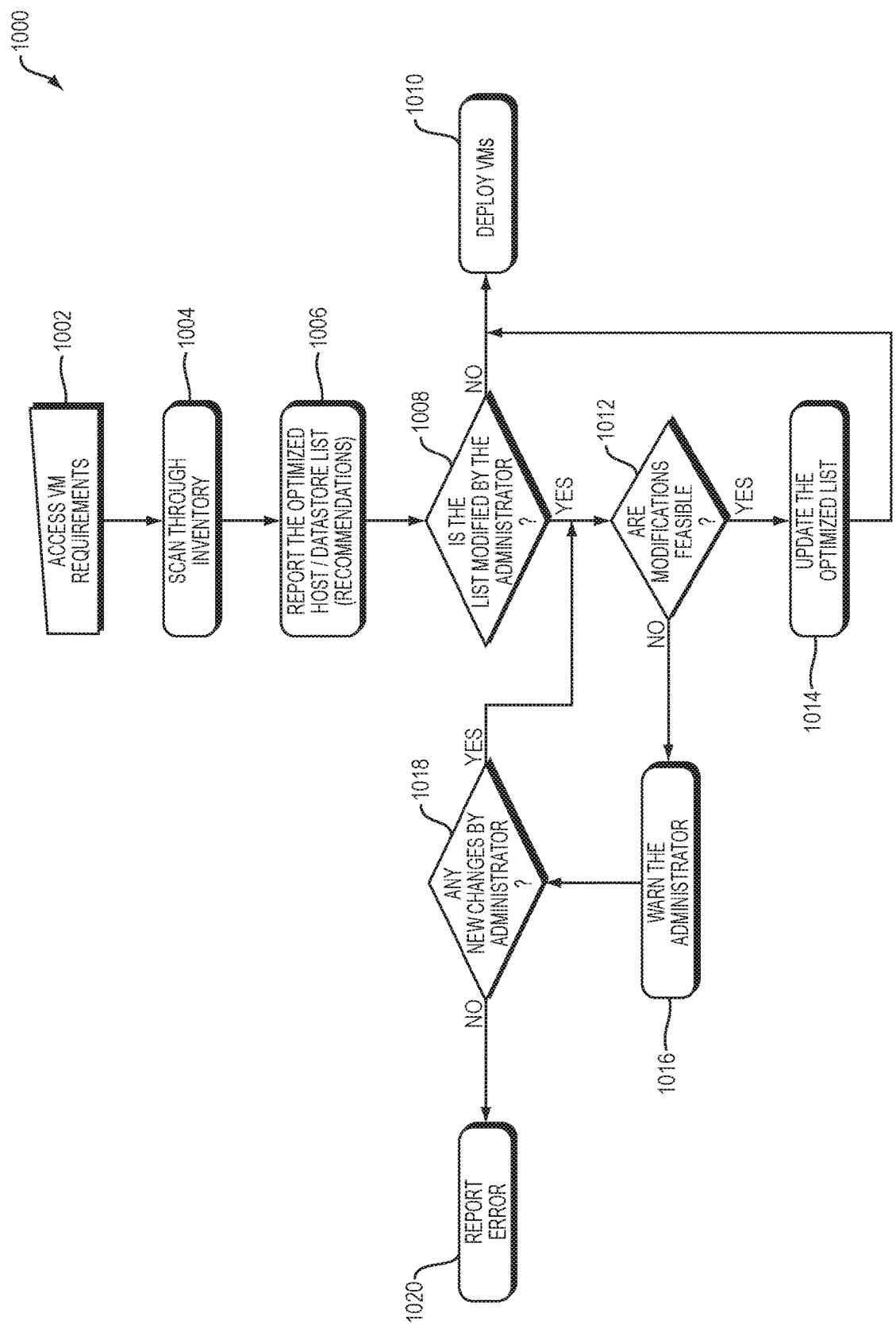
FIG. 10 is a flowchart of an exemplary method in which an administrator overrides recommended candidate hosts and candidate datastores.

FIG. 10 is a flowchart of an exemplary method 1000 in which administrator 402 overrides recommended candidate hosts 314 and candidate datastores 316. While method 1000 is described with reference to VM placement engine 310 (shown in FIG. 3), it is contemplated that method 1000 may be performed by any computing device.

VM placement engine 310 accesses requirements for the batch of VMs to be created at 1002, scans inventory 410 at 1004 to identify candidate hosts 314 and datastores 316, and produces a set of the identified candidate hosts 314 and datastores 316 as recommendations in an optimized host/datastore list. The optimized host/datastore list is reported to administrator 402 at 1006. If the list is not modified by administrator 402 at 1008, VM placement engine 310 proceeds to deploy the VMs at 1010.

If administrator 402 modifies the list (e.g., one or more of the recommendations) and the modifications are determined by VM placement engine 310 to be feasible at 1012, VM placement engine 310 updates the optimized list at 1014 and proceeds to deploy the VMs at 1010. If the modifications are determined to not be feasible at 1016, administrator 402 is notified or warned at 1016. If administrator 402 does not provide any new changes at 1018, an error is reported at 1020 and deployment ceases. Any new changes from administrator 402 at 1018 are checked for feasibility at 1012 before becoming part of the optimized list at 1014.

Figure 11:
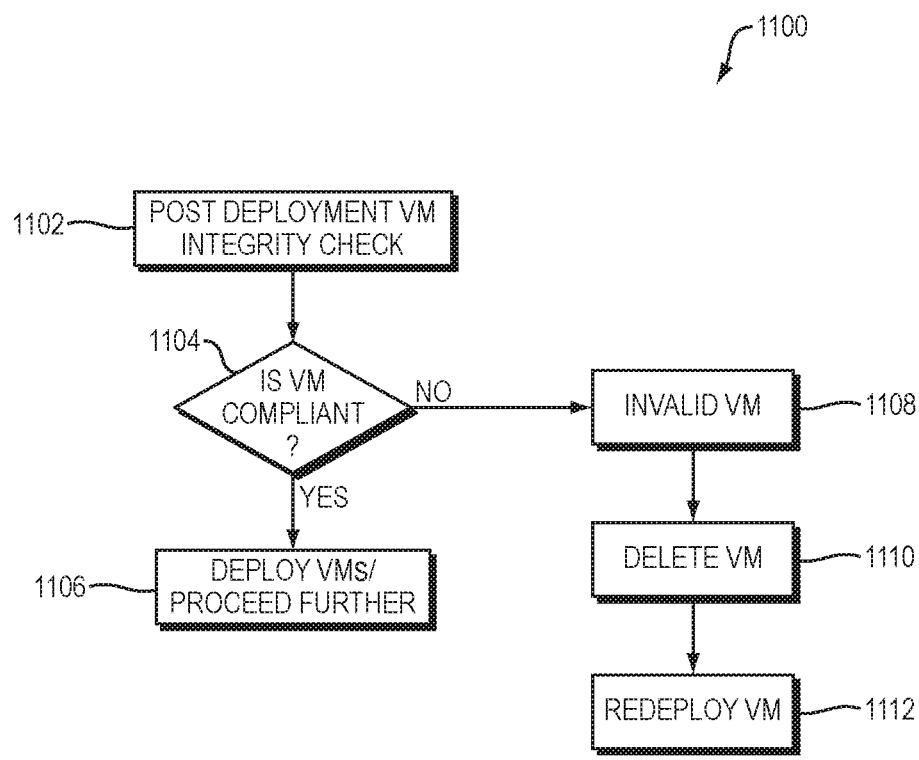
FIG. 11 is a flowchart of an exemplary method performed by the VM placement engine to implement a post-deployment VM integrity check.

FIG. 11 is a flowchart of an exemplary method 1100 performed by VM placement engine 310 to implement a post-deployment VM integrity check. While method 1100 is described with reference to VM placement engine 310 (shown in FIG. 3), it is contemplated that method 1100 may be performed by any computing device.

VM placement engine 310 begins the post-deployment VM integrity check at 1102 by determining if the deployed VM is compliant at 1104. If so, VM placement engine 310 proceeds to deploy additional VMs at 1106. If not, the deployed VM is considered invalid at 1108, deleted at 1110, and re-deployed at 1112.

Figure 12:
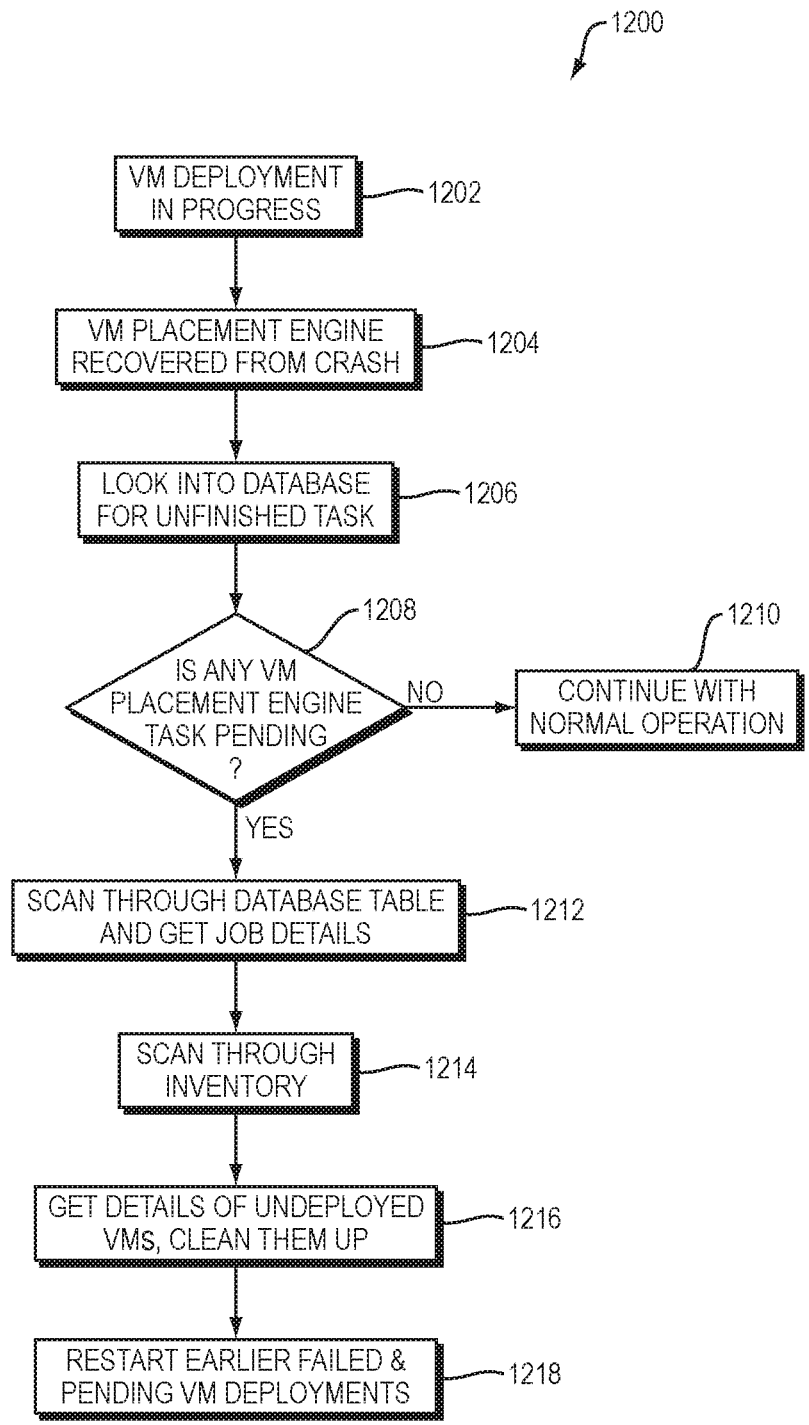
FIG. 12 is a flowchart of an exemplary method performed by the VM placement engine to recover from failure of the VM placement engine during VM deployment.

FIG. 12 is a flowchart of an exemplary method 1200 performed by VM placement engine 310 to recover from failure of VM placement engine 310 (e.g., represented as VPXD) during VM deployment. While method 1200 is described with reference to VM placement engine 310 (shown in FIG. 3), it is contemplated that method 1200 may be performed by any computing device.

With VM deployment in progress at 1202 and after VPXD recovers at 1204, VM placement engine 310 checks the status log (e.g., a database or table) for unfinished deployment tasks at 1206. If there are no VM placement engine 310 (VMPE) tasks pending at 1208, deployment continues at 1210. If there are VM placement engine 310 tasks pending at 1208, VM placement engine 310 scans through the status log (e.g., a database or table) at 1212 to obtain information about the pending tasks. The available inventory 410 is scanned at 1214, and information about VMs not fully deployed is obtained at 1216. Failed and pending VM deployments are re-started at 1218.

Figure 13:
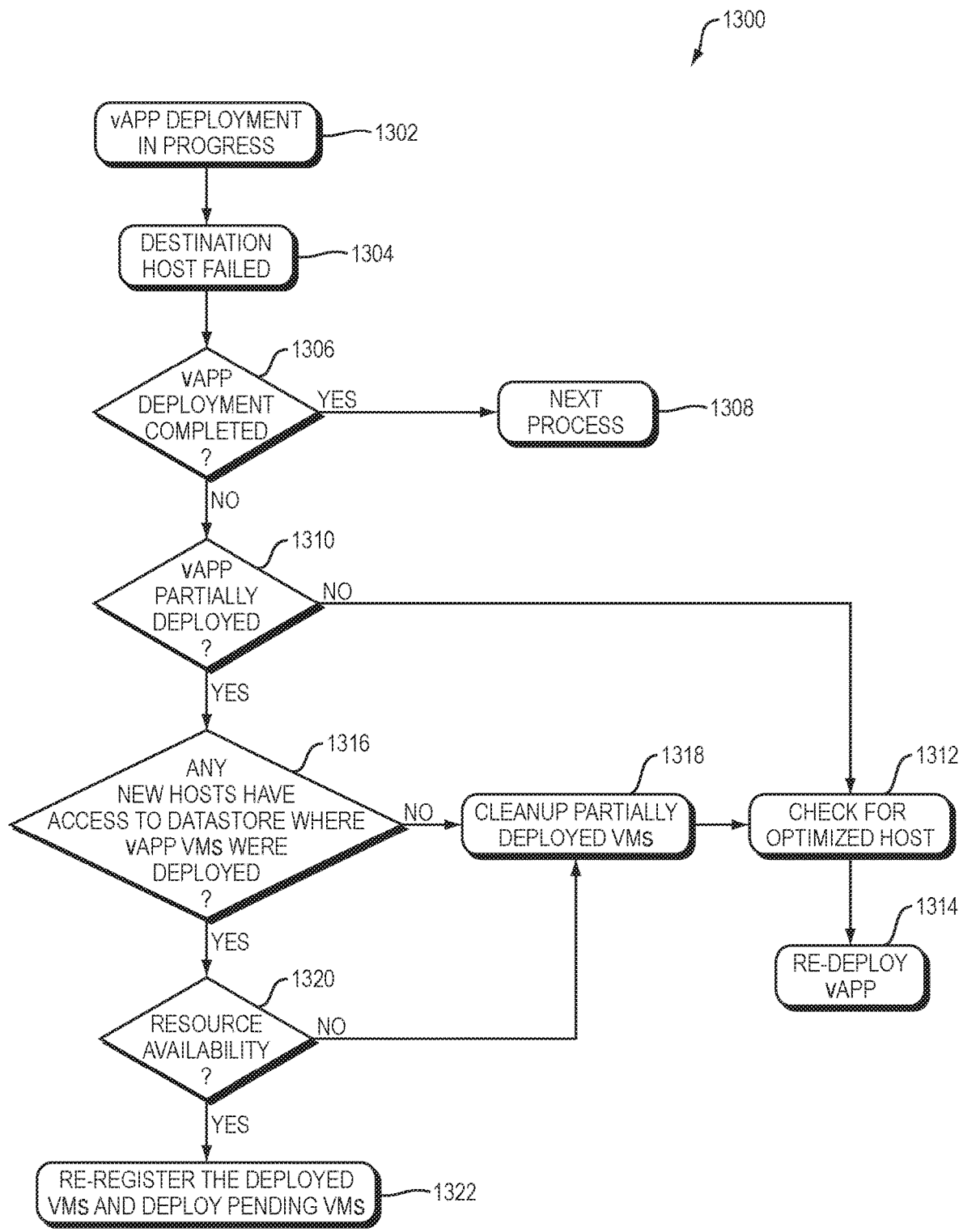
FIG. 13 is a flowchart of an exemplary method performed by the VM placement engine to recover from failure of a candidate host during virtual application deployment.

FIG. 13 is a flowchart of an exemplary method 1300 performed by VM placement engine 310 to recover from failure of a candidate host during virtual application (vApp) deployment. A vApp represents one or more VMs. While method 1300 is described with reference to VM placement engine 310 (shown in FIG. 3), it is contemplated that method 1300 may be performed by any computing device.

During vApp deployment at 1302, VM placement engine 310 detects or otherwise becomes aware of failure of a destination host or other candidate host at 1304. If vApp deployment is completed at 1306, VM placement engine 310 proceeds with the next deployment process at 1308. If the vApp deployment was not complete at 1306 but the vApp is fully deployed at 1310, VM placement engine 310 searches for a new optimized host 314 at 1314 on which to re-deploy the vApp at 1314.

If the vApp was only partially deployed at 1310, VM placement engine 310 searches for a new host(s) 314 that have access to the same datastore 316 containing other VMs associated with the vApp at 1316. If such a new host 314 exists, the available resources of new host 314 are compared to the resource requirements of the vApp VMs at 1320. If the available resources are sufficient or compatible, VM placement engine 310 re-registers the deployed VMs with the new host 314 and deploys pending VMs on new host 314 at 1322.

If there is no new host 314 at 1316 or no new host 314 with suitable resources at 1320, VM placement engine 310 removes the partially deployed VMs at 1318 and searches for a new optimized host 314 at 1312 on which to re-deploy the vApp at 1314.

Figure 22:
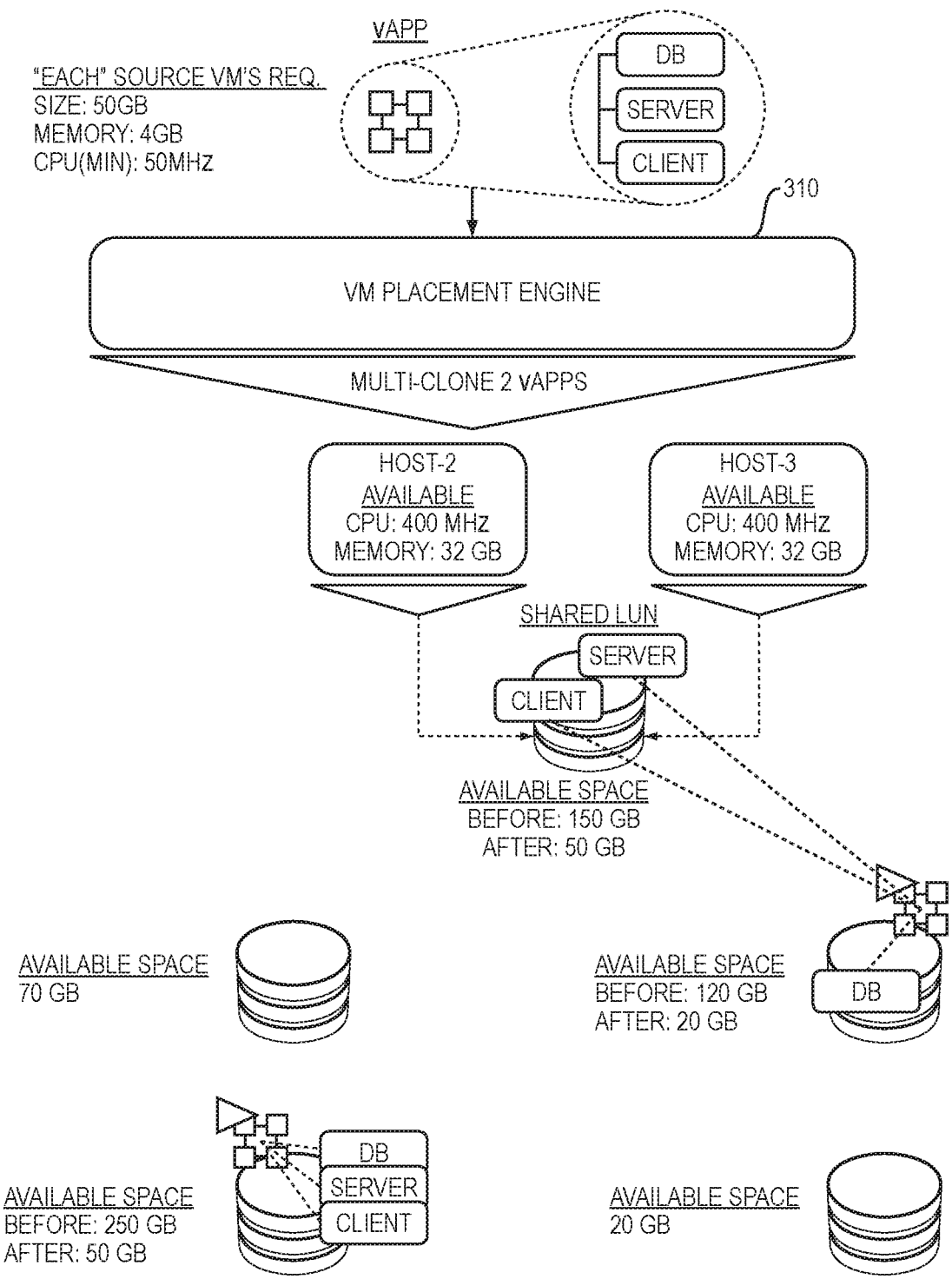
FIG. 22 is a block diagram of the cloning of a vApp onto two hosts.
Figure 23:
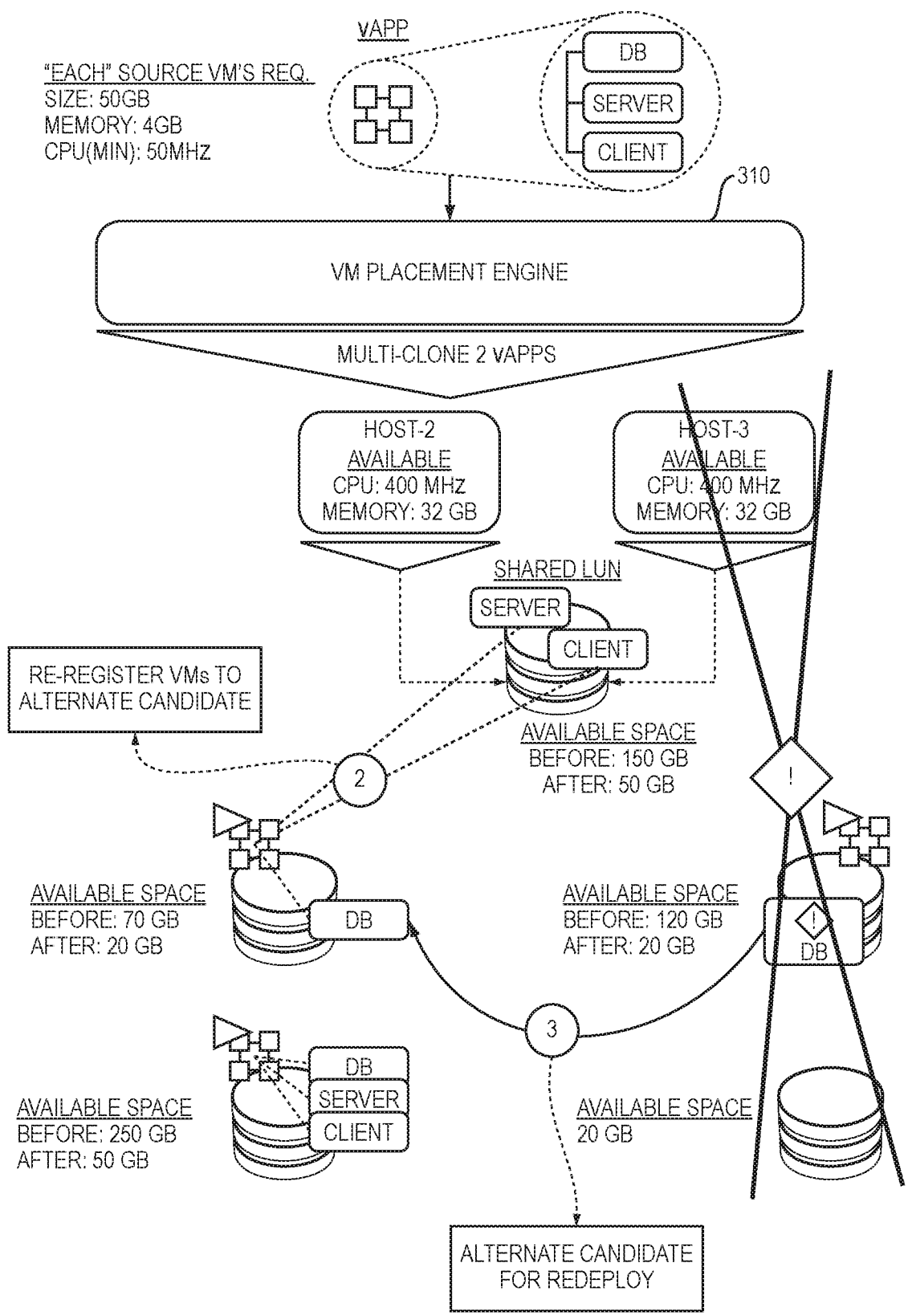
FIG. 23 is a block diagram of the response of the VM placement engine to failure of one of the hosts shown in FIG. 22.

An exemplary block diagram illustrating the response by VM placement engine 310 to failure of host 314 using the exemplary method 1300 is shown in FIG. 22 and FIG. 23. In FIG. 22, VM placement engine 310 attempts to multi-clone two vApps from a source vApp having a database (DB), server, and client. For the first clone, VM placement engine 310 deploys the DB, server, and client on a datastore associated with Host-2. For the second clone, VM placement engine 310 deploys the DB on a datastore associated with Host-3 and places the server and client on a shared LUN datastore registered to Host-3.

When Host-3 fails as shown in FIG. 23, VM placement engine 310 selects a datastore associated with Host-2 as an alternate candidate for re-deployment of the DB. VM placement engine 310 further re-registers the server and client to Host-2.

Figure 14:
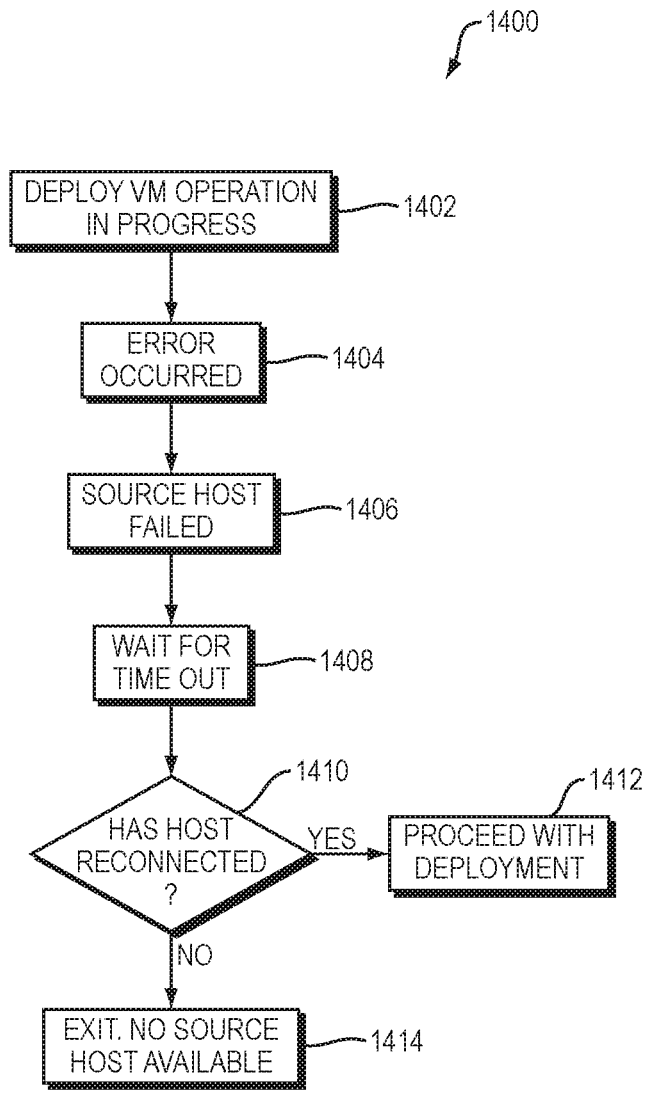
FIG. 14 is a flowchart of an exemplary method performed by the VM placement engine to recover from failure of a source host during VM deployment.

FIG. 14 is a flowchart of an exemplary method 1400 performed by VM placement engine 310 to recover from failure of a source host 314 during VM deployment. While method 1400 is described with reference to VM placement engine 310 (shown in FIG. 3), it is contemplated that method 1400 may be performed by any computing device.

During VM deployment at 1402, VM placement engine 310 detects or otherwise becomes aware of an error at 1404. The error is determined to be failure of source host 314 at 1406. VM placement engine 310 waits for a predefined time-out duration (e.g., 10 minutes) at 1408 before checking whether source host 314 has re-connected at 1410. If source host 314 reconnects at 1410, VM placement engine 310 proceeds with deployment at 1412. Otherwise, without source host 314, VM placement engine 310 ends the deployment process at 1414.

Figure 15:
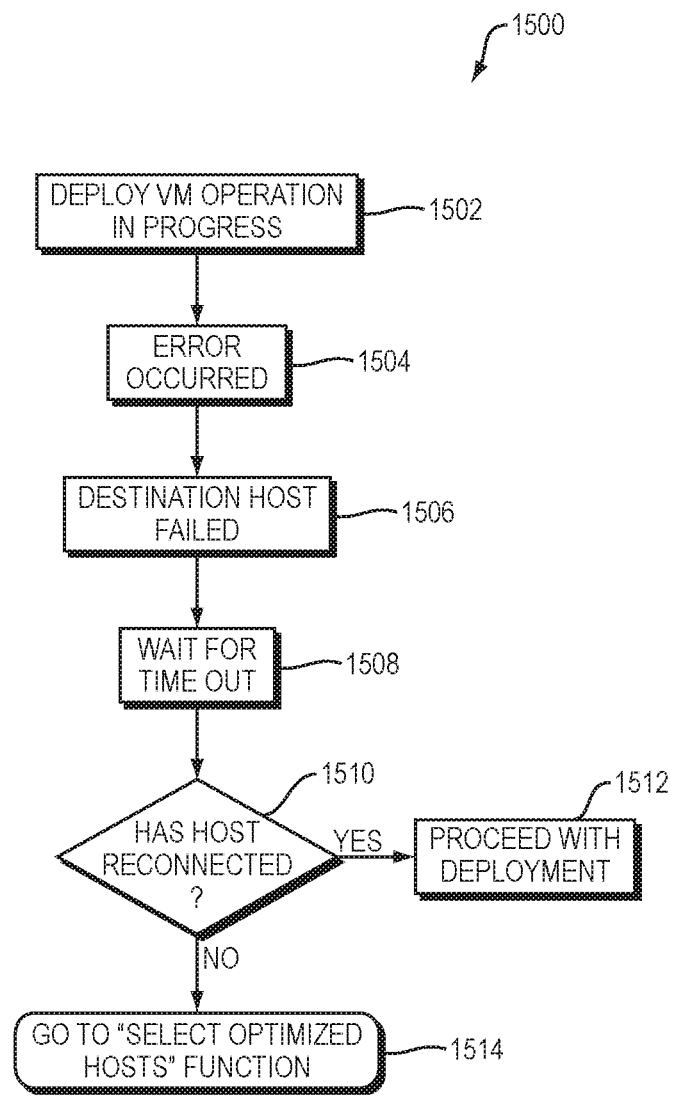
FIG. 15 is a flowchart of an exemplary method performed by the VM placement engine to recover from failure of a candidate host during VM deployment.

FIG. 15 is a flowchart of an exemplary method 1500 performed by VM placement engine 310 to recover from failure of one of the candidate hosts 314 during VM deployment. While method 1500 is described with reference to VM placement engine 310 (shown in FIG. 3), it is contemplated that method 1500 may be performed by any computing device.

During VM deployment at 1502, VM placement engine 310 detects or otherwise becomes aware of an error at 1504. The error is determined to be failure of the destination host 314 or other candidate host 314 at 1506. VM placement engine 310 waits for a predetermined time-out duration (e.g., 10 minutes) at 1508 before checking whether destination host 314 has re-connected at 1510. If destination host 314 reconnects at 1510, VM placement engine 310 proceeds with deployment at 1512. Otherwise, VM placement engine 310 proceeds to select another destination host 314 at 1514 in order to proceed with VM deployment.

Figure 16:
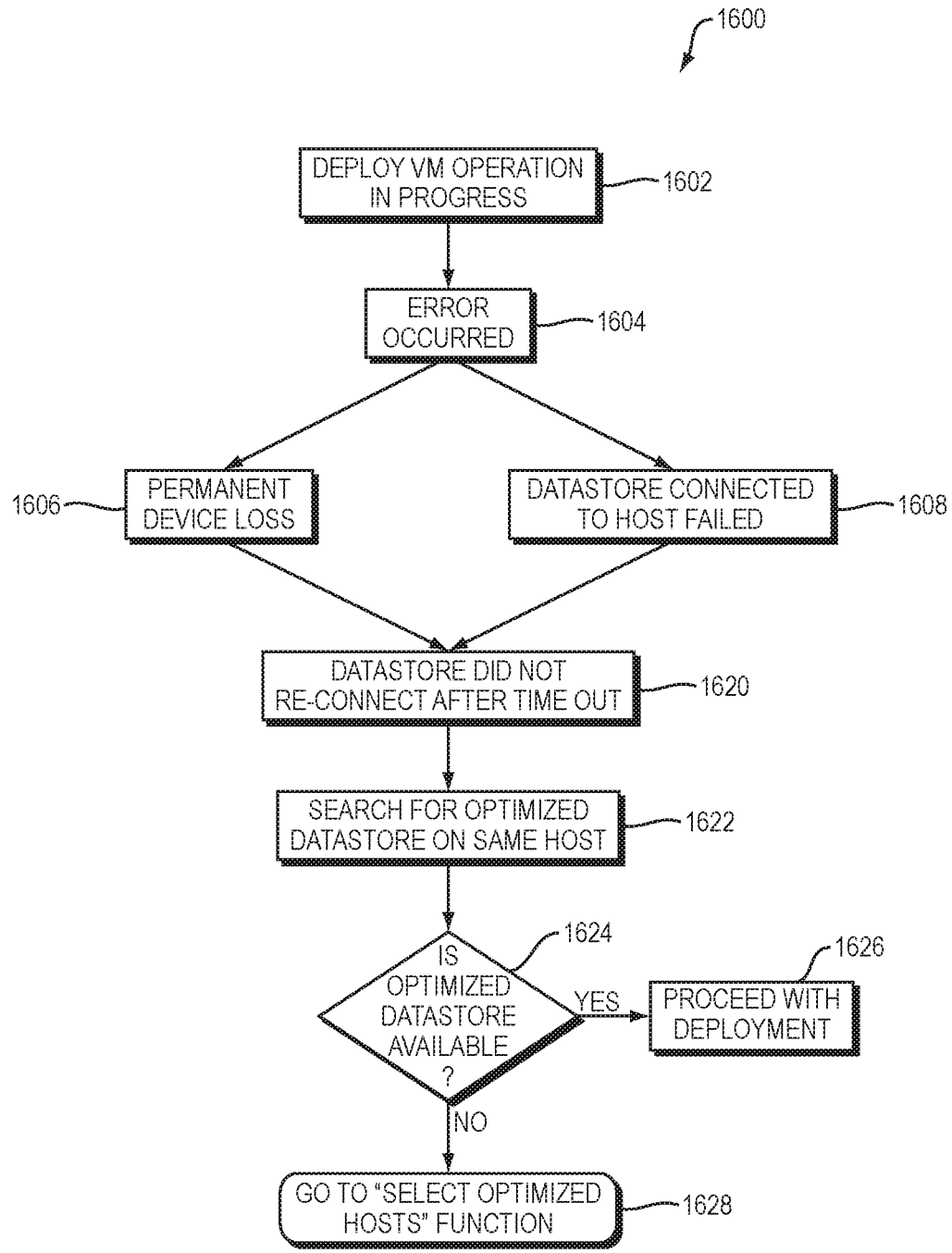
FIG. 16 is a flowchart of an exemplary method performed by the VM placement engine to recover from permanent failure of a candidate datastore during VM deployment.

FIG. 16 is a flowchart of an exemplary method 1600 performed by VM placement engine 310 to recover from permanent failure of candidate datastore 316 during VM deployment. While method 1600 is described with reference to VM placement engine 310 (shown in FIG. 3), it is contemplated that method 1600 may be performed by any computing device.

During VM deployment at 1602, VM placement engine 310 detects or otherwise becomes aware of an error at 1604. In the example in FIG. 16, the error is determined to be either permanent device loss at 1606 or failure of datastore 316 connected to host 314 at 1608. In either event, datastore 316 does not re-connect after a predetermined time-out duration (e.g., 10 minutes) at 1620. VM placement engine 310 proceeds to search for a new datastore 316 on the same host 314 at 1622. If there is a new datastore 316 available at 1624, VM placement engine 310 proceeds with VM deployment using host 314 and new datastore 316 at 1626. Otherwise, VM placement engine 310 proceeds to select another host 314 at 1628 in order to proceed with VM deployment.

Figure 17:
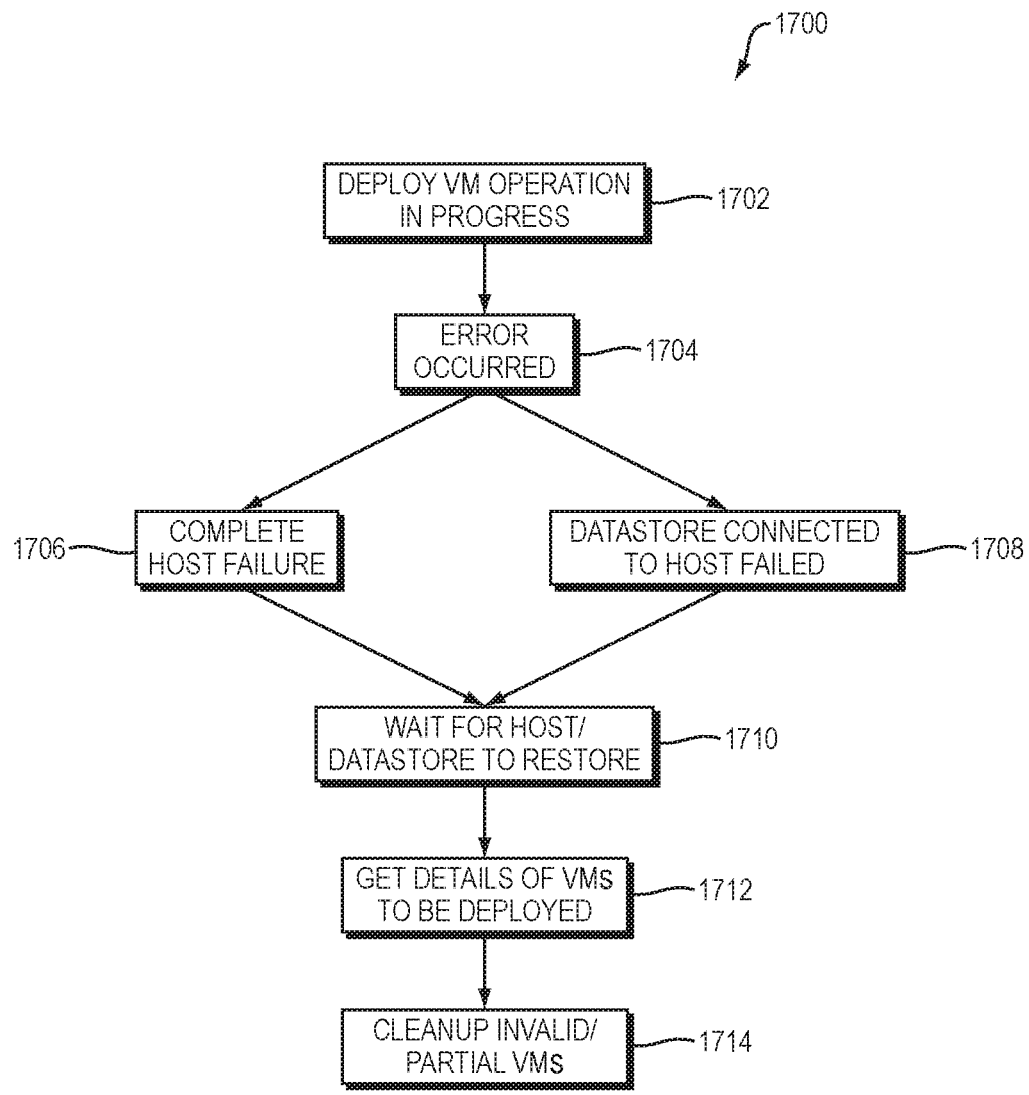
FIG. 17 is a flowchart of an exemplary method performed by the VM placement engine to recover from transient failure of a candidate datastore during VM deployment.

FIG. 17 is a flowchart of an exemplary method 1700 performed by VM placement engine 310 to recover from transient failure of a candidate datastore 316 during VM deployment. While method 1700 is described with reference to VM placement engine 310 (shown in FIG. 3), it is contemplated that method 1700 may be performed by any computing device.

During VM deployment at 1702, VM placement engine 310 detects or otherwise becomes aware of an error at 1704. In the example of FIG. 17, the error is determined to be either a complete host failure at 1706 or failure of datastore 316 connected to host 314 at 1708. In either event, the failure is temporary as VM placement engine 310 waits for host 314 or datastore 316 to restore at 1710. After host 314 or datastore 316 restores, VM placement engine 310 obtains information about VMs not fully deployed at 1712. VM placement engine 310 performs cleanup or removal or invalid or partially deployed VMs at 1714.

Administrator 402 may also request that a batch of VM operations stop or otherwise be interrupted. Rather than requiring administrator 402 to manually identify and suspend the relevant, in-process VM operations as in some of the existing systems, VM placement engine 310 identifies the status of each VM operation via the status log and suspends the identified VM operations (e.g., allow in-process VM deployments to finish, yet prevent new VM operations or deployments from triggering or otherwise beginning). Similarly, administrator 402 may request complete cancellation of a batch of VM operations. Rather than requiring administrator 402 to identify every deployed VM and manually remove each of the deployed VMs as in some of the existing systems, VM placement engine 310 checks the status log to identify each deployed VM and to perform cleanup operations to automatically remove the deployed VMs.

In some embodiments, administrator 402 provides constraints for selecting hosts 314 to contain one of the VMs to be deployed. Administrator 402 may request that VM placement engine 310 preserve a threshold quantity or portion of resources, available post-deployment, on one or more of hosts 314 being evaluated to contain VMs. For example, the request may specify that hosts 314 have at least 10% of processor resources available post-deployment and/or 10% of memory resources available post-deployment. In this example, if VM placement engine 310 has consumed more than 90% of the available processor or memory resources on a particular host 314, VM placement engine 310 removes that particular host 314 from the recommended set of hosts 314, thus preventing that host 314 from containing additional VMs. If VM placement engine 310 is unable to identify any hosts 314 meeting the constraints requested by administrator 402, a warning is sent to administrator 402.

Aspects of the disclosure further provide report generation. For example, administrator 402 may request that VM placement engine 310 obtain and provide details of deployment tasks (e.g., previous tasks, current tasks, or tasks within a requested date or time range). VM placement engine 310 searches the status log or other memory store to identify the requested deployment tasks and to generate a report (e.g., a deployment report). An exemplary report includes details for each deployment task such as the source host, quantity of VMs requested to be deployed, quantity of VMs actually deployed, destination host(s), error recovery details, and/or any other information contained in the status log. Administrator 402 may also customize the reports to obtain a particular subset of the available information, in any format.

ADDITIONAL EXAMPLES

The following scenarios are merely exemplary and not intended to be limiting in any way.

In one scenario, administrator 402 has chosen a destination host 314 and datastore 316 for creating six (6) VMs in a batch. VM placement engine 310 directly starts the clone/deploy operations and creates the six VMs on the specified destination host/datastore. In another scenario, administrator 402 has chosen destination hosts 314 but not any datastores 316. In this example, VM placement engine 310 selects datastores 316 by evaluating the compatibility, disk space, and network constraints of destination hosts 314. The processor load and memory usage on destination hosts 314 is also evaluated if administrator 402 has chosen to power on the VMs after cloning and deployment. For example, VM placement engine 310 may not choose a particular datastore 316 if, after cloning, the particular datastore 316 would be left with minimal space (e.g., two gigabytes). Instead, VM placement engine 310 may place two VMs on the same datastore 316 that will be left with more disk space (e.g., fifteen gigabytes) after cloning.

In another scenario, even though a particular one of the hosts 314 has enough memory and processor resources, VM placement engine 310 does not choose the particular host 314 to contain one of the VMs because of a hardware incompatibility between the VM version and the version of the particular host 314.

In still another scenario, administrator 402 has chosen a pool of hosts 314 such as a cluster, folder, or datacenter. If there are no resource or compatibility constraints on these hosts 314, VM placement engine 310 distributes the VMs evenly across the pool of hosts 314. For example, if there are six VMs to place and three hosts 314 in the pool, VM placement engine 310 clones two VMs onto each host 314.

Figure 18:
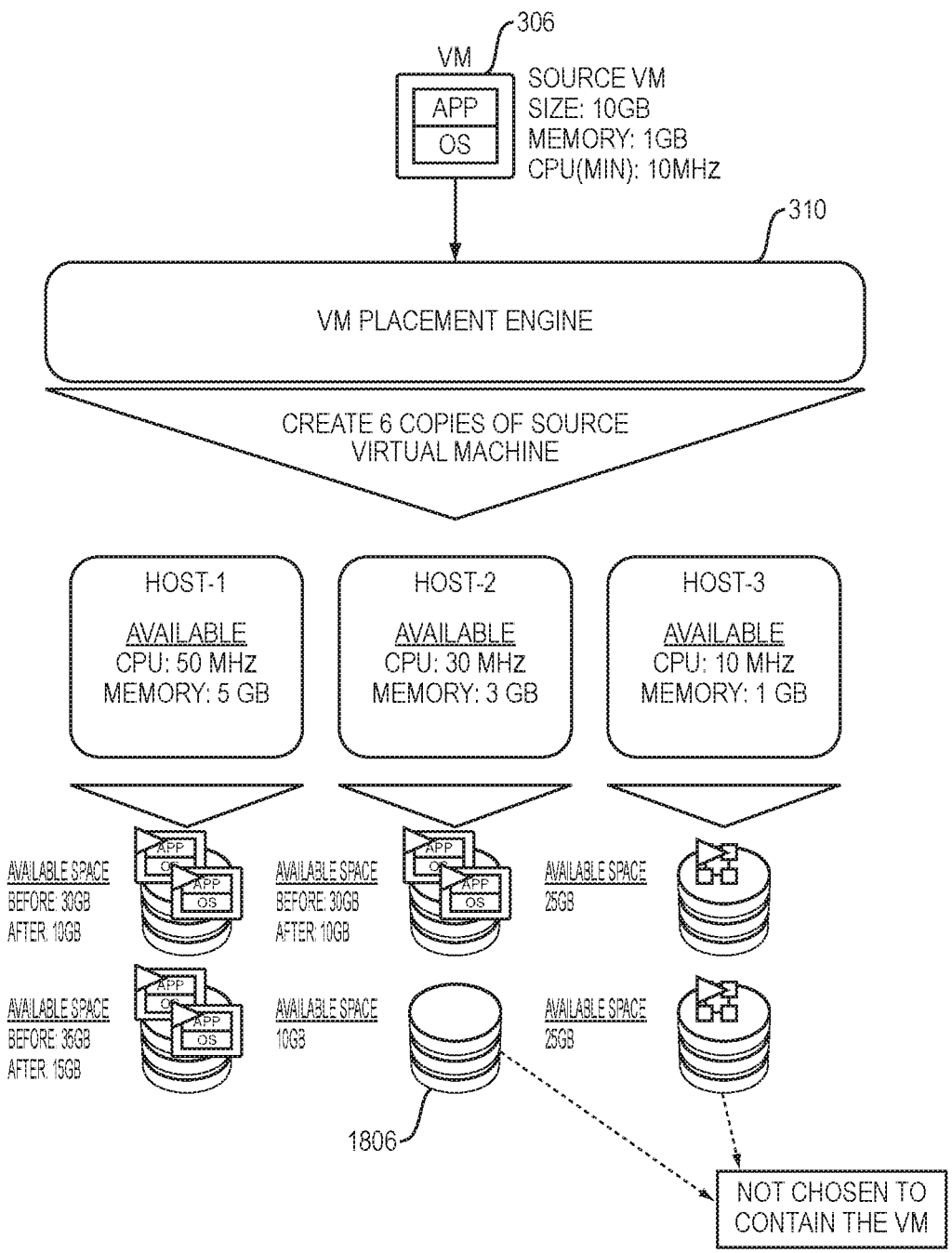
FIGS. 18-20 are block diagrams of various examples of the VM placement engine selecting and deploying a plurality of VMs.

In FIG. 18, VM placement engine 310 has not chosen Host-3 to place, clone, and/or deploy any of the six VMs due to processor and memory constraints. Datastore 1806 of Host-2 has also not been chosen due to due to disk space constraints. Instead, Host-1 and Host-2 have been chosen to host each of the VMs to be deployed. In this example, Host-1 has been selected to place four VMs (e.g., two each datastore) while Host-2 places two VMs on one datastore.

Figure 19:
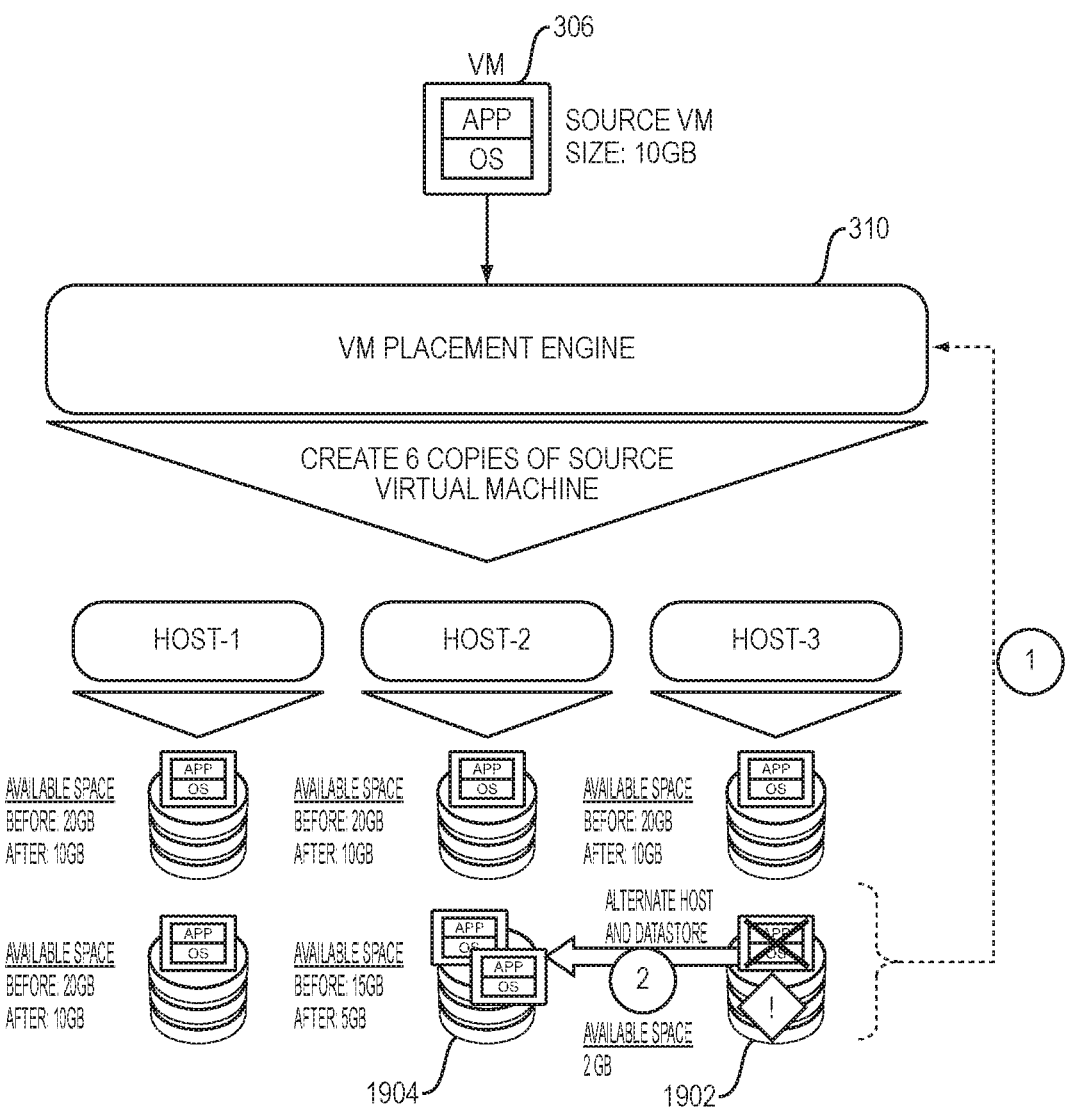

In FIG. 19, datastore 1902 on Host-3 runs out of disk space after VM placement engine 310 triggers VM clone and deploy operations. Rather than aborting the operations as in some of the existing systems, VM placement engine 310 detects the error and automatically searches for another suitable datastore first on the same Host-3 then on other hosts Host-1 and Host-2 if no suitable datastores are available on Host-3. If there are no suitable datastores, VM placement engine 310 logs an error. In this example, the other datastore on Host-3 is not suitable as it only have ten gigabytes of space, leaving the datastore with no space after cloning/deploying. Thus, datastore 1904 on Host-2 is selected, and VM placement engine 310 re-clones and deploys the VM onto datastore 1904.

Figure 20:
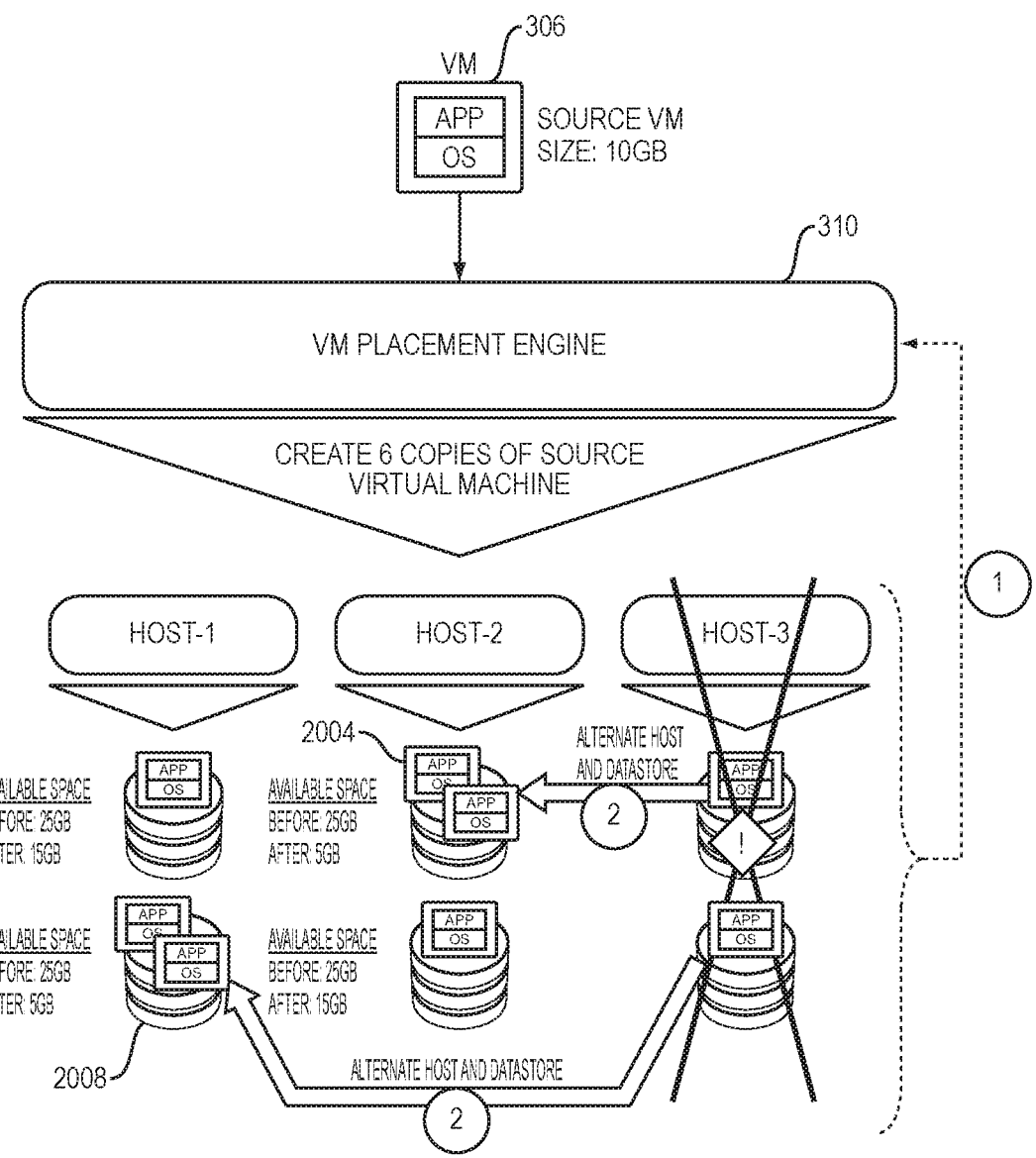

In FIG. 20, one of the destination hosts (host-3) fails during deployment. In this example, VM placement engine 310 has begun deploying the VMs and, while deployment is in progress, communication between VM placement engine 310 and Host-3 is lost (e.g., because of a host reboot, hardware failure, or other issue). VM placement engine 310 waits for a predefined duration (e.g., an option configurable by administrator 402) for failed Host-3 to reconnect. If Host-3 reconnects within the predefined duration, the failed deploy operation would be restarted on Host-3. If, as in the example of FIG. 20, Host-3 fails to reconnect, VM placement engine 310 reiterates through the remaining hosts Host-1 and Host-2 to try to place the VMs that were supposed to be placed on Host-3. If the resources of the remaining hosts are not suitable, an error is reported to administrator 402. In this example, however, VM placement engine 310 selects datastore 2004 on Host-2 and datastore 2008 on Host-1 as the alternate hosts/datastores for placing, cloning, and deploying the two VMs from failed Host-3.

In another example (not shown), VM placement engine 310 is unable to find sufficient resources for placing all the requested VMs. In such an example, VM placement engine 310 reports an error but continues to deploy as many of the VMs as possible based on the available resources.

Exemplary Operating Environment

The operations described herein may be performed by a computer or computing device. The computing devices communicate with each other through an exchange of messages and/or stored data. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, exclude propagated data signals, and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The embodiments illustrated and described herein as well as embodiments not specifically described herein but within the scope of aspects of the invention constitute exemplary means for monitoring the deployment of the plurality of VMs on the selected one or more candidate hosts 314 and the selected one or more candidate datastores 316, and exemplary means for automatic error recovery during the deployment of the plurality of VMs on the selected one or more candidate hosts 314 and the selected one or more candidate datastores 316.

At least a portion of the functionality of the various elements illustrated in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Therefore, the following is claimed:

1. A non-transitory computer-readable medium comprising executable instructions which, when executed by a first at least one computing device for a virtual machine placement engine, cause the first at least one computing device to at least:

identify an optimized host list that comprises a second at least one computing device and a third at least one computing device upon which a plurality of virtual machines can be deployed, the optimized host list being based at least in part on a host compatibility with the plurality of virtual machines;

determine that a load for the virtual machine placement engine falls below an overloading threshold;

cause the plurality of virtual machines to be deployed on the second at least one computing device and a compatible data store;

determine that a deployment of one of the plurality of virtual machines has failed on the second at least one computing device based on a deployment integrity check of a resource requirement, the deployment integrity check comprises comparing a deployed configuration of the one of the plurality of virtual machines with the resource requirement for the one of the plurality of virtual machines;

determine that the third at least one computing device has access to the compatible data store used by the second at least one computing device in an instance after the deployment integrity check; and cause, in response to the load determination, the one of the plurality of virtual machines to be redeployed on the third at least one computing device.

2. The non-transitory computer-readable medium of claim 1, wherein causing the plurality of virtual machines to be deployed on the second at least one computing device further comprises:
identifying a clustered host upon which to deploy the one of the plurality of virtual machines, the clustered host being identified based at least in part on a request to deploy the plurality of virtual machines.

3. The non-transitory computer-readable medium of claim 2, wherein the request to deploy the plurality of virtual machines comprises a cluster type, the cluster type including at least one of: a high availability cluster, a cluster with a distributed resource scheduler, or a cluster subject to a distributed power management process.

4. The non-transitory computer-readable medium of claim 2, wherein the executable instructions, when executed by the first at least one computing device, further cause the first at least one computing device to at least:
determine that there are sufficient computing resources for deploying the one of the plurality of virtual machines on the clustered host and an associated shared data store.

5. The non-transitory computer-readable medium of claim 1, wherein causing the plurality of virtual machines to be deployed on the second at least one computing device further comprises:
determining that a standalone host is unavailable for deploying the one of the plurality of virtual machines; and
identifying a clustered host for deploying the one of the plurality of virtual machines.

6. The non-transitory computer-readable medium of claim 1, wherein the executable instructions, when executed by the first at least one computing device, further cause the first at least one computing device to at least:
cause the one of the plurality of virtual machines to be power cycled.

7. A system, comprising:
a compatible data store; and
a first computing device in communication with the compatible data store;
program instructions executable in the first computing device that, when executed by the first computing device for a virtual machine placement engine, cause the first computing device to at least:
identify an optimized host list that comprises a second computing device and a third computing device upon which a plurality of virtual machines can be deployed, the optimized host list being based at least in part on a host compatibility with the plurality of virtual machines;
determine that a load for the virtual machine placement engine falls below an overloading threshold;
cause the plurality of virtual machines to be deployed on the second computing device and the compatible data store;
determine that a deployment of one of the plurality of virtual machines has failed on the second computing device based on a deployment integrity check of a resource requirement;
determine that the third computing device has access to the compatible data store used by the second computing device in an instance after the deployment integrity check, the deployment integrity check comprises comparing a deployed configuration of the one of the plurality of virtual machines with the resource requirement for the one of the plurality of virtual machines; and
cause, in response to the load determination, the one of the plurality of virtual machines to be redeployed on the third computing device.

8. The system of claim 7, wherein causing the plurality of virtual machines to be deployed on the second computing device further comprises identifying a clustered host upon which to deploy the one of the plurality of virtual machines, the clustered host being identified based at least in part on a request to deploy the plurality of virtual machines.

9. The system of claim 8, wherein the request to deploy the plurality of virtual machines comprises a cluster type, the cluster type including at least one of: a high availability cluster, a cluster with a distributed resource scheduler, or a cluster subject to a distributed power management process.

10. The system of claim 8, wherein the program instructions, when executed by the first computing device, further cause the first computing device to at least determine that there are sufficient computing resources for deploying the one of the plurality of virtual machines on the clustered host and an associated shared data store.

11. The system of claim 7, wherein causing the plurality of virtual machines to be deployed on the second computing device further comprises:
determining that a standalone host is unavailable for deploying the one of the plurality of virtual machines; and
identifying a clustered host for deploying the one of the plurality of virtual machines.

12. The system of claim 7, wherein the program instructions, when executed by the first computing device, further cause the first computing device to at least:
detect that at least the one of the plurality of virtual machines has failed to deploy to the second computing device;
identify at least one pending deployment task based on information maintained in a status log; and
cause the at least one pending deployment task to be restarted.

13. The system of claim 7, wherein the program instructions, when executed by the first computing device, further cause the first computing device to at least cause the one of the plurality of virtual machines to be power cycled.

14. A method, comprising:
identifying, by a virtual machine placement engine executed on a first computing device, an optimized host list that comprises a second computing device and a third computing device upon which a plurality of virtual machines can be deployed, the optimized host list being based at least in part on a host compatibility with the plurality of virtual machines;
determining, by the virtual machine placement engine executed on the first computing device, that a load for the virtual machine placement engine falls below an overloading threshold;
causing, by the virtual machine placement engine executed on the first computing device, the plurality of virtual machines to be deployed on the second computing device and a compatible data store;
determining, by the virtual machine placement engine executed on the first computing device, that a deployment of one of the plurality of virtual machines has failed on the second computing device based on a deployment integrity check of a resource requirement;

determining, by the virtual machine placement engine executed on the first computing device, that the third computing device has access to the compatible data store used by the second computing device in an instance after the deployment integrity check, the deployment integrity check comprises comparing a deployed configuration of the one of the plurality of virtual machines with the resource requirement for the one of the plurality of virtual machines; and causing, by the virtual machine placement engine executed on the first computing device, in response to the load determination, the one of the plurality of virtual machines to be redeployed on the third computing device.

15. The method of claim 14, wherein causing the plurality of virtual machines to be deployed on the second computing device further comprises identifying, by the first computing device, a clustered host upon which to deploy the one of the plurality of virtual machines, the clustered host being identified based at least in part on a request to deploy the plurality of virtual machines.

16. The method of claim 15, wherein the request to deploy the plurality of virtual machines comprises a cluster type, the cluster type including at least one of: a high availability cluster, a cluster with a distributed resource scheduler, or a cluster subject to a distributed power management process.

17. The method of claim 15, further comprising determining, by the first computing device, that there are sufficient computing resources for deploying the one of the plurality of virtual machines on the clustered host and an associated shared data store.

18. The method of claim 14, wherein causing the plurality of virtual machines to be deployed on the second computing device further comprises:

determining that a standalone host is unavailable for deploying the one of the plurality of virtual machines; and identifying a clustered host for deploying the one of the plurality of virtual machines.

19. The method of claim 14, further comprising causing, by the first computing device, the one of the plurality of virtual machines to be power cycled.

* * * * *